(12) United States Patent
Man et al.

(10) Patent No.: US 10,773,973 B2
(45) Date of Patent: Sep. 15, 2020

(54) ENHANCED FOAM REMOVAL OF TOTAL SUSPENDED SOLIDS AND MULTIPLY CHARGED CATIONS FROM AQUEOUS OR AQUEOUS/OIL MIXED PHASE VIA INCREASED VISCOELASTICITY

(71) Applicant: ECOLAB USA INC., Saint Paul, MN (US)

(72) Inventors: Victor Fuk-Pong Man, St. Paul, MN (US); Michael Charles Denoma, Vadnais Heights, MN (US)

(73) Assignee: Ecolab USA Inc., Saint Paul, MN (US)

( * ) Notice: Subject to any disclaimer, the term of this patent is extended or adjusted under 35 U.S.C. 154(b) by 1154 days.

(21) Appl. No.: 13/791,366

(22) Filed: Mar. 8, 2013

(65) Prior Publication Data

US 2014/0251920 A1 Sep. 11, 2014

(51) Int. Cl.
*C02F 1/68* (2006.01)
*C02F 1/24* (2006.01)
(Continued)

(52) U.S. Cl.
CPC ............... *C02F 1/24* (2013.01); *B03D 1/008* (2013.01); *B03D 1/0043* (2013.01); *B03D 1/24* (2013.01);
(Continued)

(58) Field of Classification Search
CPC ...... C02F 1/24; C02F 1/68; C02F 1/66; C02F 1/72; C02F 1/547; C02F 1/50;
(Continued)

(56) References Cited

U.S. PATENT DOCUMENTS 3,489,686 A   1/1970 Parran, Jr.
4,600,761 A * 7/1986 Ruffner ................. C08F 220/04
                                               507/120
(Continued)

FOREIGN PATENT DOCUMENTS

EP    0 911 022 B1    4/1999
EP    0 916 720 A1    5/1999
(Continued)

OTHER PUBLICATIONS

ACRYSOL™ TT-615 Rheology Modifier, data sheet, Rohm and Haas, pp. 1-5 (Sep. 2005), online @ http://www.dow.com/assets/attachments/business/architectural_and_functional_coatings/acrysol_tt/acrysol_tt-615/tds/acrysol_tt-615.pdf (downloaded Dec. 22, 2015).*

(Continued)

*Primary Examiner* — Michael A Salvitti
(74) *Attorney, Agent, or Firm* — McKee, Voorhees & Sease, PLC

(57) ABSTRACT

The present invention provides improved methods for purifying and/or removing multiply charged cations and suspended solids from water. In particular the process relates to an additive composition that has the appropriate surfactant characteristics for effectively removing multiply charged cations and suspended solids from an aqueous or oil/aqueous mixed phase via foam fractionation. According to the invention, a hydrophobically modified polymer that acts as an associative thickener is used in the presence of a source of alkalinity or anionic reactant as well as surfactant in appropriate ratios to facilitate multiply charged cation and suspended solids removal for water purification in any of a number of commercial, environmental and industrial applications.

18 Claims, 12 Drawing Sheets

(51) Int. Cl.
| | |
|---|---|
| *B03D 1/008* | (2006.01) |
| *B03D 1/004* | (2006.01) |
| *B03D 1/24* | (2006.01) |
| C02F 1/66 | (2006.01) |
| C02F 1/52 | (2006.01) |
| C02F 1/50 | (2006.01) |
| C02F 101/32 | (2006.01) |
| C02F 1/72 | (2006.01) |
| C02F 1/56 | (2006.01) |
| C02F 1/54 | (2006.01) |
| B03D 1/01 | (2006.01) |
| B03D 1/012 | (2006.01) |
| B03D 1/014 | (2006.01) |

(52) U.S. Cl.
CPC .............. *C02F 1/68* (2013.01); *B03D 1/01* (2013.01); *B03D 1/011* (2013.01); *B03D 1/012* (2013.01); *B03D 1/014* (2013.01); *B03D 2201/04* (2013.01); *B03D 2203/006* (2013.01); *C02F 1/50* (2013.01); *C02F 1/5263* (2013.01); *C02F 1/547* (2013.01); *C02F 1/56* (2013.01); *C02F 1/66* (2013.01); *C02F 1/683* (2013.01); *C02F 1/72* (2013.01); *C02F 2101/325* (2013.01); *C02F 2305/04* (2013.01)

(58) Field of Classification Search
CPC .......... C02F 1/5263; C02F 1/683; C02F 1/56; C02F 2101/325; C02F 2305/04; B03D 1/008; B03D 1/24; B03D 1/0043; B03D 1/011; B03D 2203/006; B03D 1/014; B03D 1/012; B03D 1/01; B03D 2201/04
See application file for complete search history.

(56) References Cited

U.S. PATENT DOCUMENTS

| | | | |
|---|---|---|---|
| 5,576,279 A | | 11/1996 | Pyles |
| 5,700,771 A | | 12/1997 | Hardy et al. |
| 6,197,100 B1 | * | 3/2001 | Melbouci ................ C08J 3/05 |
| | | | 106/174.1 |
| 6,258,859 B1 | | 7/2001 | Dahayanake et al. |
| 6,482,866 B1 | | 11/2002 | Dahayanake et al. |
| 6,608,020 B1 | | 8/2003 | Durbut et al. |
| 6,703,352 B2 | | 3/2004 | Dahayanake et al. |
| 6,831,108 B2 | | 12/2004 | Dahayanake et al. |
| 7,025,883 B1 | | 4/2006 | Olivier |
| 7,238,648 B2 | | 7/2007 | Dahayanake et al. |
| 7,279,446 B2 | | 10/2007 | Colaco et al. |
| 7,288,616 B2 | * | 10/2007 | Tamareselvy .......... C08F 220/04 |
| | | | 526/287 |
| 7,481,935 B2 | | 1/2009 | Olivier |
| 7,999,035 B2 | | 8/2011 | Boeckh et al. |
| 8,759,276 B2 | * | 6/2014 | Man ........................ C11D 1/94 |
| | | | 134/25.2 |
| 8,759,277 B1 | * | 6/2014 | Man .................... C11D 3/3757 |
| | | | 134/25.2 |
| 9,102,902 B2 | * | 8/2015 | Man .................... C11D 3/3757 |
| 9,127,238 B2 | * | 9/2015 | Man ........................ C11D 1/94 |
| 9,144,610 B2 | * | 9/2015 | Braun .................... A61K 47/32 |
| 10,435,308 B2 | * | 10/2019 | Man ..................... B03D 1/008 |
| 2002/0069901 A1 | | 6/2002 | Evers |
| 2003/0119706 A1 | | 6/2003 | Pfeiffer et al. |
| 2003/0171247 A1 | * | 9/2003 | Meine ..................... C11D 1/94 |
| | | | 510/504 |
| 2005/0166464 A1 | * | 8/2005 | Smith ...................... C09G 1/02 |
| | | | 51/309 |
| 2006/0234890 A1 | * | 10/2006 | Griese ................... C09D 9/005 |
| | | | 510/214 |
| 2007/0004609 A1 | * | 1/2007 | Hloucha .............. A61K 8/8152 |
| | | | 510/130 |
| 2007/0179078 A1 | * | 8/2007 | Collin .................. A61K 8/8147 |
| | | | 510/480 |
| 2008/0312343 A1 | * | 12/2008 | Braun ...................... C08F 2/32 |
| | | | 514/772.3 |
| 2009/0111716 A1 | | 4/2009 | Hough et al. |
| 2009/0215662 A1 | | 8/2009 | Boeckh et al. |
| 2010/0294498 A1 | | 11/2010 | Svoboda et al. |
| 2011/0092398 A1 | | 4/2011 | Dahanayake et al. |
| 2011/0228162 A1 | * | 9/2011 | Ogino ...................... G02B 7/38 |
| | | | 348/345 |
| 2012/0122747 A1 | | 5/2012 | Nekmard et al. |
| 2013/0190410 A1 | * | 7/2013 | Braun .................... A61K 47/32 |
| | | | 514/772.6 |
| 2013/0266531 A1 | * | 10/2013 | Yuan-Huffman ...... A61Q 19/00 |
| | | | 424/70.16 |
| 2014/0144815 A1 | * | 5/2014 | Liu ........................ B03D 1/004 |
| | | | 209/166 |
| 2014/0251919 A1 | * | 9/2014 | Man ........................ C02F 1/682 |
| | | | 210/705 |
| 2014/0287980 A1 | * | 9/2014 | Man ..................... C11D 3/3757 |
| | | | 510/475 |

FOREIGN PATENT DOCUMENTS

| | | |
|---|---|---|
| WO | WO 97/23546 A1 | 7/1997 |
| WO | WO 97/28207 A1 | 8/1997 |
| WO | WO 97/28208 A1 | 8/1997 |
| WO | WO 99/07815 A1 | 2/1999 |
| WO | WO 2010/025116 A1 | 3/2010 |
| WO | WO 2011/143602 A1 | 11/2011 |

OTHER PUBLICATIONS

ACUSOL™ 820 Rheology Modifier and Stabilizer, data sheet, Rohm and Haas, pp. 1-8 (Jaqnuary 2003), online @ http://www.dow.com/assets/attachments/business/pmat/acusol_rheology_modifiers/acusol_820/tds/acusol_820.pdf (downloaded Dec. 22, 2015).*
ACUSOL™ 801S Rheology Modifier for Heavy Duty Liquid Detergents . . . data sheet, Rohm and Haas, pp. 1-7 (Jul. 2002), online @ https://www.dow.com/assets/attachments/business/pmat/acusol_detergent_polymers/acusol_801s/tds/acusol_801s.pdf. (downloaded Sep. 17, 2018). (Year: 2002).*
PCT/US2013/071550—Ecolab USA Inc. filed Nov. 23, 2013, "Notification of Transmittal of the International Search Report and the Written Opinion of the International Searching Authority, or the Declaration" dated Feb. 24, 2014.
PCT/US2013/071549—Ecolab USA Inc. filed Nov. 23, 2013, "Notification of Transmittal of the International Search Report and the Written Opinion of the International Searching Authority, or the Declaration" dated Feb. 24, 2014.
Angelescu, Daniel George, et al., "Adsorption of Branched-Linear Polyethyleneimine—Ethylene Oxide Conjugate on Hydrophilic Silica Investigated by Ellipsometry and Monte Carlo Simulations", Langmuir, ACS Publications 2011, pp. 9961-9971, (Jul. 2011).
BASF the Chemical Company, "Care Chemicals & Formulators, Lupasol types", issue dated Apr. 2010, pp. 1-10.
Procter & Gamble Professional, "Material Safety Data Sheet—Dawn Heavy Duty Floor Cleaner", Version 5, Oct. 28, 2010, pp. 1-4.
Procter & Gamble Professional, "Material Safety Data Sheet—Dawn Heavy Duty Floor Cleaner—concentrate", Version 3, Nov. 1, 2010, pp. 1-5.
Procter & Gamble Professional, "Material Safety Data Sheet—Dawn Liquid Detergent for Power Wash Sinks—concentrate", Version 5, Apr. 5, 2011, pp. 1-5.
Procter & Gamble Professional, "Material Safety Data Sheet—Dawn Liquid Detergent for Power Wash Sinks", Version 3, Nov. 1, 2010, pp. 1-4.
Procter & Gamble Professional, "Material Safety Data Sheet—Dawn Manual Pot and Pan Detergent—Concentrate", Version 8, Nov. 3, 2010, pp. 1-5.
Procter & Gamble Professional, "Material Safety Data Sheet—Dawn Manual Pot and Pan Detergent", Version 6 Nov. 1, 2010, pp. 1-4.

(56) References Cited

OTHER PUBLICATIONS

Procter & Gamble Professional, "Material Safety Data Sheet—Dawn Professional Dish Detergent", Version 1, May 2, 2012, pp. 1-5.

Procter & Gamble Professional, "Material Safety Data Sheet—Dawn Ultra Heavy Duty Degreaser concentrate", Version 3, May 4, 2011, pp. 1-5.

Procter & Gamble Professional, "Material Safety Data Sheet—Mr. Clean Magic Eraser with the Grease Fighting Power of Dawn", Jun. 2010, pp. 1-5.

Ecolab USA Inc., PCT/US2013/029963, filed on Mar. 8, 2013 The International Search Report and the Written Opinion of the International Searching Authority, or the Declaration, dated Jul. 25, 2013.

* cited by examiner

ENHANCED FOAM REMOVAL OF TOTAL SUSPENDED SOLIDS AND MULTIPLY CHARGED CATIONS FROM AQUEOUS OR AQUEOUS/OIL MIXED PHASE VIA INCREASED VISCOELASTICITY

FIELD OF THE INVENTION

The present invention provides improved methods for purifying and/or removing total suspended solids and multiply charged cations suspended or dissolved in water. In particular the process relates to an additive composition that has the appropriate surfactant characteristics for effectively removing an oil phase from an aqueous or oil/aqueous mixed phase via foam fractionation. The foam fractionation techniques and additives may be used to remove total suspended solids and multiply charged cations in any of a number of water purification embodiments such as purification of waste water and the like.

BACKGROUND OF THE INVENTION

Foam fractionation is a chemical process in which hydrophobic molecules are preferentially separated from a liquid solution using rising columns of foam. In general two mechanisms provide for effective removal of molecules from a solution, first a target molecule adsorbs to a bubble surface, and then the bubbles form a foam which travels up a column and is discharged to the foamate stream of foam fractionation.

Foam fractionation predominantly removes surfactant contaminant molecules (molecules that have polar and nonpolar ends). At the air-water interface of the bubbles the surfactant molecules orientate themselves so that the nonpolar hydrophobic end of the surfactant molecules is in air and the polar hydrophilic end of the molecule is in water. As the bubbles rise to the top of the fractionating column they remove the contaminants and settle at the top of the column as a foam.

Many organic substances can be removed by foam fractionation and larger biological material, such as algae, bacteria and viruses can also be removed. Particles present in the water can also be removed. It is thought that biological material and particles become trapped in the film surrounding the air bubbles. Inorganic material can also be removed if it can form some kind of a bond with organic matter in the water. For example, calcium carbonate and calcium phosphate complexes can collect organic matter in the water forming micro-flocs that can get trapped in the film surrounding the air bubbles. Metal ions can also form ligands with organic molecules, and glycoproteins have a high affinity for trace metals and therefore facilitate removal of metal ion species from water. Foam fractionation to date has encountered many difficulties when used in removing particles from an oil/aqueous mixed phase.

Efficient contaminant removal is complex and depends on many factors including air to water ratio; column height; air bubble diameter; air/water contact time; air bubble flow rate; foaming agent: foam wetness; downward water flow rate; foam stability; and collision speed between the water and the rising gas. Foam stability is also be an important factor and can be defined as the resistance to contaminant drainage from the foam, without foam rupturing. The foam must be stable enough to be removed from the fractionating column, without leaching of the contaminant molecules into the water occurring. The most widely used foaming agent cocamide DEA, or cocamide diethanolamine, has come under regulatory pressure and the International Agency for Research on Cancer (IARC) lists coconut oil diethanolamine condensate (cocamide DEA) as an IARC Group 2B carcinogen, which identifies this chemical as possibly carcinogenic to humans.

The use of surfactants, such as soap and synthetic detergents, for dissolving organic compounds, is well known in the art. Particularly, surfactant is applied to hydrophobic organic compounds (chemical substances which have a very low solubility in water) for the purpose either dissolving, emulsifying or dispersing the organic compounds in a water environment. Another particular property of surfactant molecules which may be related to solubilization is aggregation to sub-micron droplets, referred to in the art as micelles. In a water environment, the surfactant molecules constituting the micelle are oriented with the hydrophilic heads towards the water, i.e., outwards, and the hydrophobic tails towards the interior of the micelle. Consequently, the micelle's interior is a hydrophobic micro-environment, capable of retaining organic solutes.

It is also well known to separate surfactant micelles from water by means of an ultrafiltration mechanism. Foam fractionation may also be used. According to this mechanism, liquids containing surfactants may be purified by passing a gas through the liquid, thereby generating a foam. The foam is collected and condensed by means of a mechanical foam breaker. The method is suitable for purifying dilute surfactant solutions, since the concentration of surfactant in the foam is higher than in the original liquid.

Accordingly it is an object herein to provide a foam fractionation method that does not employ the use of cocamide DEA.

It is yet another object of the invention to provide a composition employing a surfactant platform that can be used with foam fractionation to remove multiply charged cations and total suspended solids dissolved in the same.

Other objects, aspects and advantages of this invention will be apparent to one skilled in the art in view of the following disclosure, the drawings, and the appended claims.

SUMMARY OF THE INVENTION

The invention involves the discovery of the appropriate polymer and surfactant package to enhance foam fractionation of multiply charged cations and suspended solids from an aqueous/oil mixed phase. According to the invention, the polymer used is preferably hydrophobically modified, and is an associative thickener. The type of surfactant is not critical and any surfactant can be used, although nonionic is preferred. The surfactant may be present in the additive composition or may be already present in the aqueous/oil mixed phase itself. A source of alkalinity/anionic reactant is also present.

According to the invention, compositions are formed with an effective amount of an associative thickener in the presence of a surfactant and alkalinity. The associative thickener is present in a ratio of greater than 1:1 of associative thickener to surfactant on a weight basis and may be present in a ratio of 2:1, 3:1, 4:1 and even up to 5:1. The alkalinity/anionic reactant source is present in an amount of from 250 to 5000 ppm. The components may added individually to the solution that will be foam fractionated or may be admixed in a composition to be added to the mixed phase solution prior to foam fractionation.

In some embodiments, the composition also includes additional optional detersive ingredients; wherein the compositions are substantially free of cocamide DEA. Other surfactants and standard cleaning composition components may also be included as well.

A novel cleaning method is also within the scope of the invention and involves separating suspended solids and cations from a aqueous/oil mixture by foam fractionation. In particular, the components of the invention (alkalinity/anionic reactant, associative thickener, and surfactant if not already present) is transferred to a suitable foam fractionation column, through which a continuous bubbling of gas is supplied in a counter-current flow. Suitable gases for bubbling include air, nitrogen and carbon dioxide. The gas bubbles carry the mixture as a foam into an overhead chamber that is equipped with a mechanical foam breaker to condense the foam and remove the solids and cations.

DETAILED DESCRIPTION OF THE INVENTION

Figure 1:
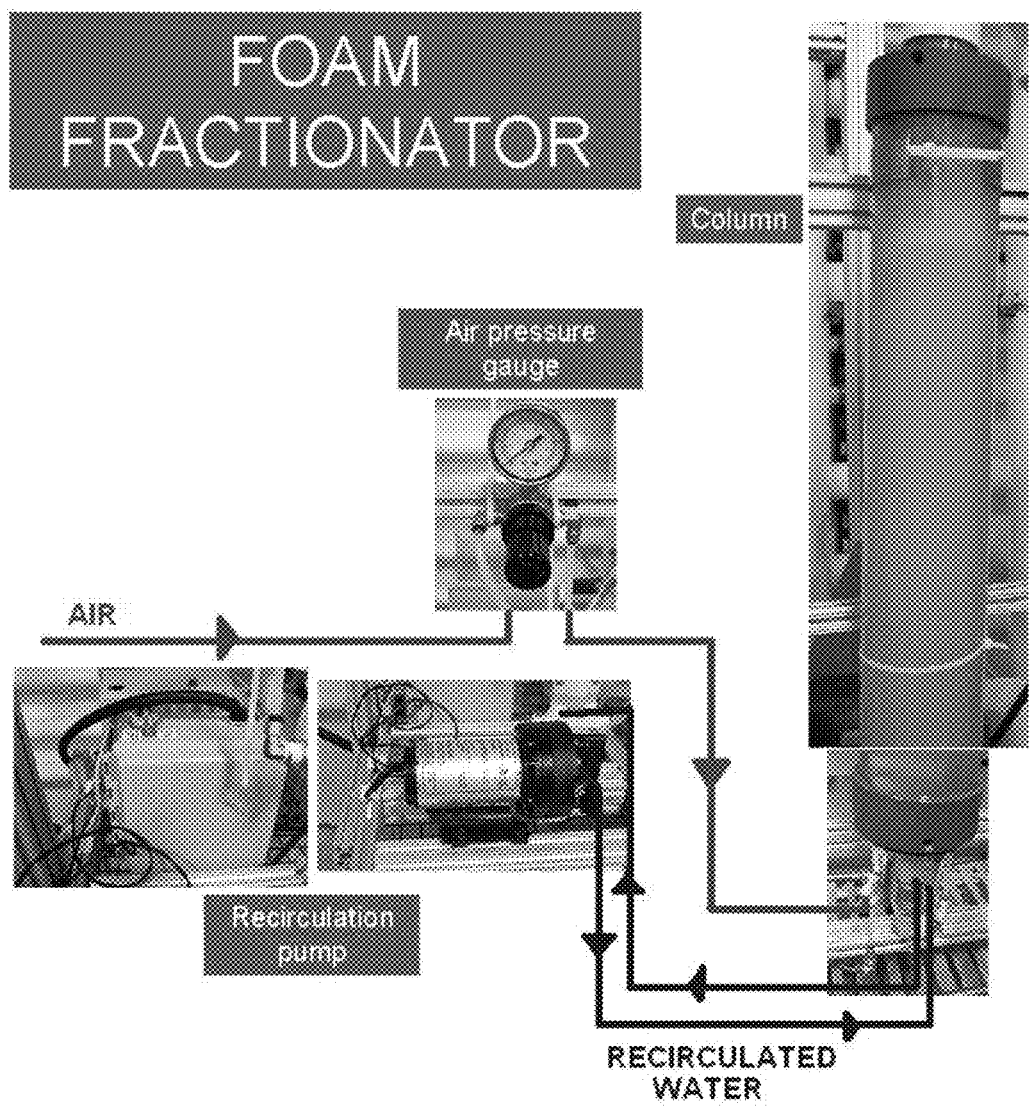
FIG. 1 shows the design of a foam fractionator that may be used in accordance with the invention and which was used in the experiments reported in the Examples section.

The present invention aims to provide improved water purification/treatment or cleaning compositions and methods for purifying and/or removing particles, and/or contaminants suspended or dissolved in water. The invention is primarily directed at removing multiply charged cations and suspended solids from an aqueous or oil/aqueous mixed phase via foam fractionation. The foam fractionation techniques and additives may be used to remove multiply charged cations and suspended solids in any of a number of water purification embodiments such as pot and pan soaking compositions, hand soaps, foam fractionation, gas exploration water removal, food and beverage foaming cleaners, vehicle cleaning, and the like.

The compositions and methods of the invention may be used independently or be combined with other water treatment methods and apparatus such as a screen or drum filter and an ultraviolet light treatment unit for water treatment purposes.

While the presently described technology will be described in connection with one or more preferred embodiments, it will be understood by those skilled in the art that the technology is not limited to only those particular embodiments. To the contrary, the presently described technology includes all alternatives, modifications, and equivalents as may be included within the spirit and scope of the appended claims.

The term "water" as used throughout the specification includes contaminated water or any other water or liquid carrying oil based or other impurities.

"Cleaning" means to perform or aid in soil removal, bleaching, microbial population reduction, rinsing, or combination thereof.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, "weight percent," "wt. %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt. %," etc.

The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g., 1 to 5 includes 1, 1.5, 2, 2.75, 3, 3.80, 4, and 5).

The terms "include" and "including" when used in reference to a list of materials refer to but are not limited to the materials so listed.

The term "water soluble" refers to a compound that can be dissolved in water at a concentration of more than 1 wt. %. The terms "sparingly soluble" or "sparingly water soluble" refer to a compound that can be dissolved in water only to a concentration of 0.1 to 1.0 wt. %. The term "water insoluble" refers to a compound that can be dissolved in water only to a concentration of less than 0.1 wt. %.

According to the invention foam fractionation may be combined with other water purification techniques such as ultrafiltration to remove and particulate matters.

Compositions for Practicing the Invention

Associative Thickeners

The compositions and methods of the invention employ the use of associative thickeners in combination with surfactants for foam fractionation. Associative thickeners are thickeners which have been known for many years and are intended for aqueous systems. They are used, inter alia, in dispersion-bound water-based paints and finishes but also other aqueous systems, for example cleaning agents, cosmetics, pickles, aqueous pigment pastes, automotive finishes, industrial coatings, printing inks, lubricating greases, plaster paints and wall paints, textile coatings, pharmaceutical preparations, crop protection formulations, filler dispersions, adhesives, detergents, wax dispersions, polishes, auxiliaries for tertiary mineral oil production etc., are adjusted theologically therewith.

The typical mode of action of these thickeners is due to their chemical composition. In general, associative thickeners consist of a water-soluble hydrophilic main part, i.e. a water-soluble polymer chain which for the most part comprises polyethylene glycol or comprises cellulose derivatives, acrylate chains, polyether chains or polyester chains, hydrophobic groups being attached to these polymer chains. The two parts are bound to one another on a very wide range of types of covalent bonds. The link here can be affected, for example, by urethane bonds, ester bonds, ether bonds, urea bonds, carbonate bonds or amide bonds.

The customary preparation of the associative thickeners is effected by reacting, for example, bifunctional alcohols (usually polyethylene glycol) with bifunctional reactants (usually diisocyanates) in a polyaddition reaction and terminating the addition reaction by adding monofunctional reactants (e.g. monofunctional alcohols, such as nonylphenol ethoxylate). The hydrophobic groups required for the formation of the associative interaction are then present as terminal groups bonded to the water-soluble polymer chain.

The hydrophilic moiety remains dissolved in the aqueous phase in the application system. The hydrophobic groups, however, accumulate at hydrophobic surfaces, for example on the dispersed or emulsified organic binders in an aqueous coating, for example an emulsion paint, on the hydrophobic surfaces of fillers, pigments, etc. Since a thickener polymer usually has two terminal (or a plurality of additional) hydrophobic moieties, it may link simultaneously to a plurality of dispersion particles. These are linked to one another with the aid of the hydrophilic base chain. It forms as a result of a thickening effect which is based on the association of the hydrophobic or of the less water-soluble moieties and the build-up of a three-dimensional network by means of van der Waals' interaction in the aqueous system. An associative thickener is referred to here as having a structural viscosity (A) if its solution viscosity in 20% strength aqueous solution is more than 100 000 mPas and the viscosity in the Acronal test system at a shear rate of 1 sec$^{-1}$ is more than 10 000 mPas (for this measurement, 16% by weight of butyldiglycol, as a viscosity-reducing substance, is added to the associative thickener having a structural viscosity, in order for it to be processable: 20% by weight of thickener+16% by weight of butyldiglycol+64% by weight of water).

One example of a commercially available associative thickener is Acusol 820 available from Dow Chemical, Midland Mich., a hydrophobically modified alkali soluble acrylic polymer Emulsion (HASE). Other associative thickeners include Sokalan AT 120 (a methacrylic acid/acrylic acid copolymer) available from BASF; Sokalan HP 25 (a modified polycarboxylate) also available from BASF; Rheomer® 33 (a hydrophobically-modified alkali swellable emulsion polymer) available from Rhodia/Solvay; Novethix™ L-10 polymer (a hydrophoically modified alkali-swellable emulsion polymer) available from Lubrizol; Polygel HP available from 3V company; and OAL1 and OAL2 available from Dow.

According to the invention, an associative thickener is added to the oil/aqueous mixture then subjected to foam fractionation. Surfactant may be present already in the aqueous mixture, or may be added as a composition combined with the associative thickener. The associative thickener and surfactant are present in the composition in a ratio of greater than 1:1 by weight of associative thickener to surfactant. The ratio can go as high as 2:1, 3:1, 4:1 or even 5:1.

Surfactants

The methods and compositions of the invention comprise a surfactant or in some cases an additional surfactant. As indicated earlier, surfactant may already be present in the oil/aqueous composition, and may include the addition of further surfactant to achieve the desired ratio, or may be admixed with the associative thickener to form an additive composition that is added to the aqueous oil composition in an effective amount to remove oil via foam fractionation. Surfactants include water soluble or water dispersible nonionic, semi-polar nonionic (supra), anionic, cationic, amphoteric, or zwitterionic surface-active agents; viscoelastic surfactants or any combination thereof. A typical listing of the classes and species of surfactants useful herein appears in U.S. Pat. No. 3,664,961 issued May 23, 1972, to Norris.

Nonionic Surfactants

The surfactant is preferably a nonionic surfactant. Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amino group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants in the present invention include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Polyethylene sorbitan fatty acid esters with the esterifying fatty acid being selected from the group consisting of $C_{12}$-$C_{18}$ fatty acids wherein an average of about 1 or 3 of said acids are esterified per polyoxyethylene sorbitan molecule. One preferred non-ionic surfactant is a mixture of laurate esters of sorbitol and sorbitol anhydrides (sorbitan) consisting predominantly of the mono-ester condensed with about 20 moles of ethylene oxide. This surfactant is designated in the CTFA dictionary as Polysorbate 20 and is also known in the art as polyoxyethylene (20) sorbitan monolaurate and is available from several commercial sources. Another suitable example of a polyoxyethylene alkyl ester is the CTFA designated Polysorbate 80 which is a mixture of oleate esters of sorbitol and sorbitol anhydrides, condensed with approximately 80 moles of ethylene oxide. In a preferred embodiment the surfactant is an sorbitan ester. In another preferred embodiment the surfactant is an ethoxylated sorbitan ester without the polyoxyethylene groups.

4. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

5. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances.

Examples of Nonionic Low Foaming Surfactants Include:

6. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

7. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

8. The alkylphenoxypolyethoxyalkanols of U.S. Pat. No. 2,903,486 issued Sep. 8, 1959 to Brown et al. and represented by the formula

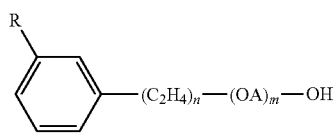

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_m H$ wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

9. Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_3$l hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

10. The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.

11. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

12. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

13. Fatty acid amide surfactants suitable for use in the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or —$(C_2H_4O)_xH$, where x is in the range of from 1 to 3.

14. A useful class of non-ionic surfactants includes the class defined as alkoxylated amines or, most particularly, alcohol alkoxylated/aminated/alkoxylated surfactants. These non-ionic surfactants may be at least in part represented by the general formulae:

$$R^{20}-(PO)_sN-(EO)_tH,$$

$$R_2O-(PO)_sN-(EO)_tH(EO)_tH, \text{ and}$$

$$R^{20}-N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}-(PO)_v-N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes Surfonic™ PEA 25 Amine Alkoxylate.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Semi-Polar Nonionic Surfactants

The semi-polar type of nonionic surface active agents was described supra.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions. Generally, however, anionics have high foam profiles which limit their use alone or at high concentration levels in cleaning systems such as CIP circuits that require strict foam control. Anionic surface active compounds are useful to impart special chemical or physical properties other than detergency within the composition. Anionics can be employed as gelling agents or as part of a gelling or thickening system. Anionics are excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Anionic sulfate surfactants suitable for use in the present compositions include the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl)glucamine sulfates, and sulfates of alkvlpolysaccharides such as the sulfates of alkylpolyglucoside (the nonionic nonsulfated compounds being described herein).

Examples of suitable synthetic, water soluble anionic detergent compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants suitable for use in the present compositions include the alkyl ethoxy carboxylates, the alkyl polyethoxy polycarboxylate surfactants and the soaps (e.g. alkyl carboxyls). Secondary soap surfactants (e.g. alkyl carboxyl surfactants) useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic detergents suitable for use in the present compositions include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy)sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amino amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

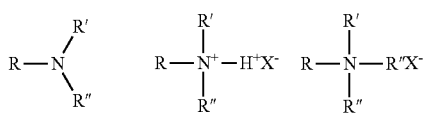

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1{}_m R^2{}_x YLZ$ wherein each $R^1$ is an organic group containing a straight or branched alkyl or alkenyl group optionally substituted with up to three phenyl or hydroxy groups and optionally interrupted by up to four of the following structures:

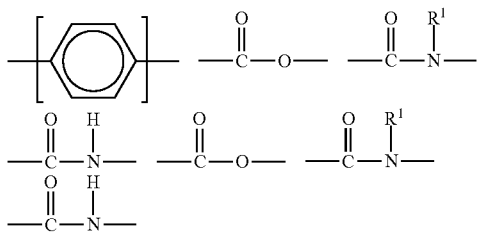

or an isomer or mixture of these structures, and which contains from 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group is filled by hydrogens.

Y can be a group including, but not limited to:

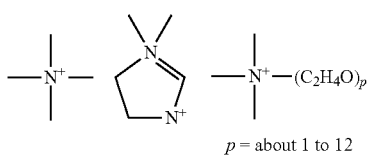

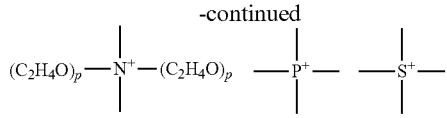

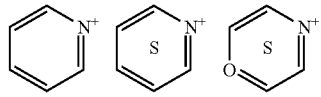

or a mixture thereof.

Preferably, L is 1 or 2, with the Y groups being separated by a moiety selected from $R^1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with ethyl acetate. During alkylation, one or two carboxy-alkyl groups react to form a tertiary amine and an ether linkage with differing alkylating agents yielding different tertiary amines. Long chain imidazole derivatives having application in the present invention generally have the general formula:

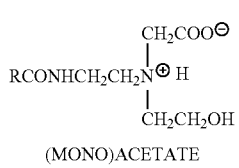

(MONO)ACETATE

-continued

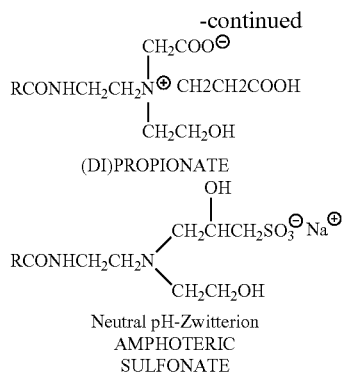

(DI)PROPIONATE

Neutral pH-Zwitterion
AMPHOTERIC
SULFONATE wherein R is an acyclic hydrophobic group containing from 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reacting $RNH_2$, in which R.dbd.$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

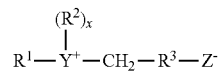

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; R.sup.2 is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-car-boxylate; 5-[S-3-hydroxypropyl-S-hexadecylsulfonio]-3-hydroxypentane-1-sul-fate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propan-e-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N (2-hydroxydodecyl)ammonio]-butane-1-carboxyl-ate; 3-[S-ethyl-S-(3-dodecoxy-2-hydroxypropyl)sulfonio]-propane-1-phosphat-e; 3-[P,P-dimethyl-P-dodecylphosphonio]-propane-1-phosphonate; and S [N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

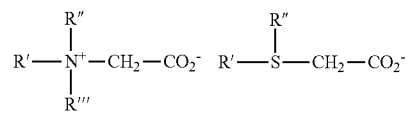

-continued

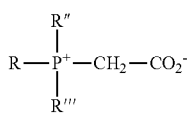

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R1)_2N.^+R^2SO^3—$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

The composition of additional surfactant can be present in the range of approximately 0-10000 ppm in cleaning solutions at use concentrations.

Viscoelastic Surfactants

In some embodiments, the surfactant is a viscoelastic surfactant. Viscoelastic surfactants may comprise any number of different compounds, including methyl ester sulfonates (e.g., as described in U.S. patent application Ser. Nos. 11/058,660, 11/058,475, 11/058,612, and 11/058,611, filed Feb. 15, 2005, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and finally, polyethyleleneimin (PEI) and its derivatives, including ethoxylated PEI and combinations of any of the foregoing. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

The aqueous viscoelastic surfactant may be based on amphoteric or zwitterionic surfactants.

The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. Examples of zwitterionic surfactants useful in the present invention are represented by the formula:

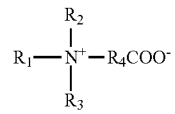

wherein $R_1$ represents a hydrophobic moiety of alkyl, alkylarylalkyl, alkoxyalkyl, alkylaminoalkyl and alkylamidoalkyl, wherein alkyl represents a group that contains from about 12 to about 24 carbon atoms which may be branched or straight chained and which may be saturated or unsaturated. Representative long chain alkyl groups include tetradecyl (myristyl), hexadecyl (cetyl), octadecentyl (oleyl), octadecyl (stearyl), docosenoic (erucyl) and the derivatives of tallow, coco, soya and rapeseed oils. The preferred alkyl and alkenyl groups are alkyl and alkenyl groups having from about 16 to about 22 carbon atoms. Representative of alkylamidoalkyl is alkylamidopropyl with alkyl being as described above. $R_2$ and $R_3$ are independently an aliphatic chain (i.e. as opposed to aromatic at the atom bonded to the quaternary nitrogen, e.g., alkyl, alkenyl, arylalkyl, hydroxyalkyl, carboxyalkyl, and hydroxyalkyl-polyoxyalkylene, e.g. hydroxyethyl-polyoxyethylene or hydroxypropyl-polyoxypropylene) having from 1 to about 30 atoms, preferably from about 1 to about 20 atoms, more preferably from about 1 to about 10 atoms and most preferably from about 1 to about 6 atoms in which the aliphatic group can be branched or straight chained, saturated or unsaturated. Preferred alkyl chains are methyl, ethyl, preferred arylalkyl is benzyl, and preferred hydroxyalkyls are hydroxyethyl or hydroxypropyl, while preferred carboxyalkyls are acetate and propionate. R4 is a hydrocarbyl radical (e.g. alkylene) with chain length 1 to 4. Preferred are methylene or ethylene groups.

Specific examples of zwitterionic surfactants include the following structures:

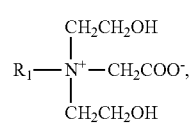

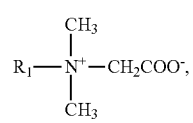

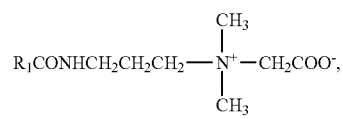

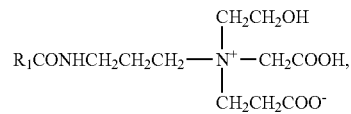

wherein $R_1$ has been previously defined herein.

Examples of amphoteric surfactants include those represented by formula VI:

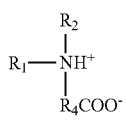

wherein $R_1$, $R_2$, and $R_4$ are the same as defined above.

Other specific examples of amphoteric surfactants include the following structures:

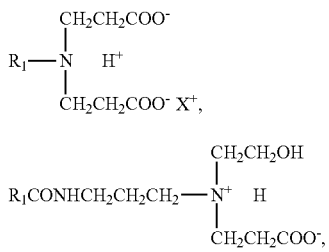

wherein $R_1$ has been previously defined herein, and $X^+$ is an inorganic cation such as $Na^+$, $K^+$, $NH_4^+$ associated with a carboxylate group or hydrogen atom in an acidic medium.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride ($C_8TAC$) systems, stearyl trimethylammonium chloride ($C_{18}TAC$)/caprylic acid sodium salt (NaCap) systems, and cetyl trimethylammonium tosylate (CTAT)/sodium dodecylbenzenesulfonate (SDBS) systems.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), DV-8829a erucicdimethylamidopropyl-betaine $C_{29}H_{57}N_2O_3^-$ Surfactant available from Rhodia Inc., Cranbury, N.J., Aromox APA-T (amine oxide surfactant available from Akzo Nobel Chemicals, Chicago, Ill.), Etho-quad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

Typical chemical processes for synthesizing viscoelastic surfactants are disclosed in U.S. Pat. No. 6,258,858 the disclosure of which is herein incorporated by reference.

Extended Surfactants

Extended chain surfactants having an intermediate polarity linking chain, such as a block of poly-propylene oxide, or a block of poly-butylene oxide or a mixture thereof inserted between the surfactants conventional lipophilic segment and hydrophilic segment. The extended surfactants can commonly be either nonionic or anionic.

In a preferred embodiment the surfactant is one or more of sorbitan monolaurate, sorbitan monostearate, sorbitan monooleate, POE (20) sorbitan monolaurate, POE (20) sorbitan monostearate, and POE (20) sorbitan monooleate.

Source of Alkalinity/Anionic Reactant

The cleaning methods and compositions include an effective amount of one or more alkaline sources/anionic reactant. In general, it is expected that a source of alkalinity/anionic reactant is added in an amount of 250 ppm to about 5000 ppm. In a preferred embodiment the alkalinity/anionic reactant is present in an amount of from 250 ppm to 2000 ppm. As indicated earlier, surfactant may already be present in the aqueous or oil/aqueous composition, and may include the addition of further alkalinity to achieve the desired ratio, or may be admixed with the associative thickener and surfactant to form an additive composition that is added to the aqueous oil or waste water composition in an effective amount to remove cations and suspended solids via foam fractionation.

Examples of suitable alkaline sources of the cleaning composition include, but are not limited to alkali metal carbonates and alkali metal hydroxides. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, lithium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution. In one embodiment, the alkali metal hydroxide is added in the form of an aqueous solution, particularly a 50% by weight hydroxide solution, to reduce the amount of heat generated in the composition due to hydration of the solid alkali material.

Other alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present cleaning compositions.

Without being bound by theory, it is thought that the sources of alkalinity such as sodium carbonate or sodium hydroxide turn the cations into insoluble complexes, which become concentrated in the foam phase by the associative thickener/surfactant network through hydrophobic nodules/interactions. The effectiveness in removal is tied to how "insoluble" the complexes are (solubility products), or perhaps there is a cut-off line for effective removal. It is expected that other reactants other than ash and caustic can be used, such as oxalate, phosphate, sulfates, etc. This includes anions which are capable of forming an insoluble salt with cations having an ionized valence of two or more, such as aluminum chloride, aluminum sulfate, barium chloride, calcium acetate, calcium chloride, calcium formate, magnesium acetate, magnesium chloride, magnesium formate, zinc acetate, zinc chloride, zinc formate, and zinc sulfate. The anions may be selected from $F^-$, $HCO3^-$, $CO_3^{2-}$, $PO_4^{3-}$, $SO_4^{2-}$ oxalate, citrate, sulfide, and polyphosphate anions. Specific examples of this chemical include, for example, magnesium carbonate, calcium carbonate, sodium fluoride, sodium hydrogen carbonate, sodium carbonate, sodium citrate, sodium oxalate, and the like.

The components may be added individually to the foam fractionator along with the water to be purified in the amounts disclosed herein, or may be admixed as additive composition.

The compositions may also include additional materials, such as additional functional materials, for example enzymes, enzyme stabilizing system, additional surfactant, chelating agents, sequestering agents, bleaching agents, thickening agent, solubility modifier, filler, anti-redeposition agent, a threshold agent or system, aesthetic enhancing agent (i.e. dye, perfume, etc.) and the like, or combinations or mixtures thereof. Adjuvants and other additive ingredients will vary according to the type of composition being manufactured and can be included in the compositions in any amount. The following is a brief discussion of some examples of such additional materials.

Water Conditioning Agent

A water conditioning agent aids in removing metal compounds and in reducing harmful effects of hardness components in service water. Exemplary water conditioning agents include chelating agents, sequestering agents and inhibitors. Polyvalent metal cations or compounds such as a calcium, a magnesium, an iron, a manganese, a molybdenum, etc. cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the invention. Both organic and inorganic water conditioning agents are common and can be used. Inorganic water conditioning agents include such compounds as sodium tripolyphosphate and other higher linear and cyclic polyphosphates species. Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. Small molecule organic water conditioning agents include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS). All of these are known and commercially available.

The composition of a water conditioning agent can be present in the range of approximately 0-5000 ppm in cleaning solutions at use concentrations.

Anti-Redeposition Agents

The composition may include an anti-redeposition agent capable of facilitating sustained suspension of soils in a cleaning solution and preventing the removed soils from being redeposited onto the substrate being cleaned. Examples of suitable antiredeposition agents include fatty acid amides, fluorocarbon surfactants, complex phosphate esters, styrene maleic anhydride copolymers, and the like.

The composition of an anti-redeposition agent can be present in the range of approximately 0-5000 ppm in cleaning solutions at use concentrations.

Hydrotrope

The compositions of the invention may optionally include a hydrotrope, coupling agent, or solubilizer that aides in compositional stability, and aqueous formulation. Functionally speaking, the suitable couplers which can be employed are non-toxic and retain the active ingredients in aqueous solution throughout the temperature range and concentration to which a concentrate or any use solution is exposed.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. Preferred coupling agents for use in the present invention include n-octanesulfonate, available as NAS 8D from Ecolab Inc., n-octyl dimethylamine oxide, and the commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of $C_6$-$C_{24}$ alcohol alkoxylates (alkoxylate means ethoxylates, propoxylates, butoxylates, and co-or-terpolymer mixtures thereof) (preferably $C_6$-$C_{14}$ alcohol alkoxylates) having 1 to about 15 alkylene oxide groups (preferably about 4 to about 10 alkylene oxide groups); $C_6$-$C_{24}$ alkylphenol alkoxylates (preferably $C_8$-$C_{10}$ alkylphenol alkoxylates) having 1 to about 15 alkylene oxide groups (preferably about 4 to about 10 alkylene oxide groups); $C_6$-$C_{24}$ alkylpolyglycosides (preferably $C_6$-$C_{20}$ alkylpolyglycosides) having 1 to about 15 glycoside groups (preferably about 4 to about 10 glycoside groups); $C_6$-$C_{24}$ fatty acid ester ethoxylates, propoxylates or glycerides; and $C_4$-$C_{12}$ mono or dialkanolamides.

The composition of a hydrotrope can be present in the range of approximately 0-10000 ppm in cleaning solutions at use concentrations.

Chelating/Sequestering Agent

The composition may include a chelating/sequestering agent such as an aminocarboxylic acid, a condensed phosphate, a phosphonate, a polyacrylate, and the like. In general, a chelating agent is a molecule capable of coordinating (i.e., binding) the metal ions commonly found in natural water to prevent the metal ions from interfering with the action of the other detersive ingredients of a cleaning composition. The chelating/sequestering agent may also function as a threshold agent when included in an effective amount. An iminodisuccinate (available commercially from Bayer as IDS™) may be used as a chelating agent.

The composition of a chelating/sequestering agent can be present in the range of approximately 0-10000 ppm in cleaning solutions at use concentrations.

Useful aminocarboxylic acids include, for example, N-hydroxyethyliminodiacetic acid, nitrilotriacetic acid (NTA), ethylenediaminetetraacetic acid (EDTA), N-hydroxyethyl-ethy lenediaminetriacetic acid (HEDTA), diethylenetriaminepentaacetic acid (DTPA), and the like. Examples of condensed phosphates useful in the present composition include sodium and potassium orthophosphate, sodium and potassium pyrophosphate, sodium tripolyphosphate, sodium hexametaphosphate, and the like. The composition may include a phosphonate such as 1-hydroxy ethane-1,1-diphosphonic acid, 2-phosphonobutane-1,2,4 tricarboxylic acid, and the like.

Polymeric polycarboxylates may also be included in the composition. Those suitable for use as cleaning agents have pendant carboxylate groups and include, for example, polyacrylic acid, maleic/olefin copolymer, acrylic/maleic copolymer, polymethacrylic acid, acrylic acid-methacrylic acid copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Thickening Agent

In some embodiments, a thickening agent may be included. Some examples of thickeners include soluble organic or inorganic thickener material. Some examples of inorganic thickeners include clays, silicates and other well-known inorganic thickeners. Some examples of organic thickeners include thixotropic and non-thixotropic thickeners. In some embodiments, the thickeners have some substantial proportion of water solubility to promote easy removability. Examples of useful soluble organic thickeners for the compositions of the invention comprise carboxylated vinyl polymers such as polyacrylic acids and alkali metal salts thereof, and other similar aqueous thickeners that have some substantial proportion of water solubility. The composition of a thickening agent can be present in the range of approximately 0-10000 ppm in cleaning solutions at use concentrations.

Bleaching Agents

The composition may include a bleaching agent in addition to or in conjunction with the source of chlorine. Bleaching agents for lightening or whitening a substrate, include bleaching compounds capable of liberating an non-chlorine active halogen species, such as iodine and iodine containing complexes, $Br_2$, and/or —$OBr^-$, under conditions typically encountered during the cleansing process. A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition of a non-chlorine bleaching agent can be present in the range of approximately 0-10000 ppm in cleaning solutions at use concentrations.

Dye or Odorant

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz). Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like. Fragrances or perfumes that may be included in the compositions include, for example, terpenoids such as citronellol, aldehydes such as amyl cinnamaldehyde, a jasmine such as ClS-jasmine orjasmal, vanillin, and the like.

Antimicrobial Agent

The compositions may optionally include an antimicrobial agent or preservative. Antimicrobial agents are chemical compositions that can be used in the compositions to prevent microbial contamination and deterioration of commercial products material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds. The given antimicrobial agent depending on chemical composition and concentration may simply limit further proliferation of numbers of the microbe or may destroy all or a substantial proportion of the microbial population. The terms "microbes" and "microorganisms" typically refer primarily to bacteria and fungus microorganisms. In use, the antimicrobial agents are formed into the final product that when diluted and dispensed using an aqueous stream forms an aqueous disinfectant or sanitizer composition that can be contacted with a variety of surfaces resulting in prevention of growth or the killing of a substantial proportion of the microbial population. Common antimicrobial agents that may be used include phenolic antimicrobials such as pentachlorophenol, orthophenylphenol; halogen containing antibacterial agents that may be used include sodium trichloroisocyanurate, sodium dichloroisocyanurate (anhydrous or dihydrate), iodine-poly(vinylpyrolidin-onen) complexes, bromine compounds such as 2-bromo-2-nitropropane-1,3-diol; quaternary antimicrobial agents such as benzalconium chloride, cetylpyridiniumchloride; amines and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Antimicrobial agents may be encapsulated to improve stability and/or to reduce reactivity with other materials in the detergent composition. When an antimicrobial agent or preservative is incorporated into the composition, the composition of an antimicrobial agent can be present in the range of approximately 0-10000 ppm in cleaning solutions at use concentrations.

Polar Carrier

The cleaning compositions of the invention may include a polar carrier media, such as water, alcohols, for example low molecular weight primary or secondary alcohols exemplified by methanol, ethanol, propanol, isopropanol, and the like, or other polar solvents, or mixtures and combinations thereof.

Polar carrier may be present in the composition in the range of about 10 to about 90%, in the range of about 20 to about 80%, or in the range of about 25 to 75% by weight based on the total weight of the composition.

Enzymes

The composition of the invention may include one or more enzymes, which may act by degrading or altering one or more types of soil residues encountered thus removing the soil or making the soil more removable by a surfactant or other component of the cleaning composition. For example, one or more proteases can cleave complex, macromolecular protein structures present in soil residues into simpler short chain molecules which are, of themselves, more readily solubilized or otherwise more easily removed by solutions containing said proteases.

Suitable enzymes may include a protease, an amylase, a lipase, a gluconase, a cellulase, a peroxidase, or a mixture thereof of any suitable origin, such as vegetable, animal, bacterial, fungal or yeast origin. Selections are influenced by factors such as pH-activity and/or stability optima, thermostability, and stability to active detergents, builders and the like. In this respect bacterial or fungal enzymes may be preferred, such as bacterial amylases and proteases, and fungal cellulases. Preferably the enzyme may be a protease, a lipase, an amylase, or a combination thereof. Enzyme may be present in the composition from at least 0.01 wt %, or 0.01 to 2 wt %.

Enzyme Stabilizing System

The composition of the invention may include an enzyme stabilizing system. The enzyme stabilizing system can include a boric acid salt, such as an alkali metal borate or amine (e. g. an alkanolamine) borate, or an alkali metal borate, or potassium borate. The enzyme stabilizing system can also include other ingredients to stabilize certain enzymes or to enhance or maintain the effect of the boric acid salt.

For example, the cleaning composition of the invention can include a water soluble source of calcium and/or magnesium ions. Calcium ions are generally more effective than magnesium ions and are preferred herein if only one type of cation is being used. Cleaning to and/or stabilized enzyme cleaning compositions, especially liquids, may include 1 to 30, 2 to 20, or 8 to 12 millimoles of calcium ion per liter of finished composition, though variation is possible depending on factors including the multiplicity, type and levels of enzymes incorporated. Water-soluble calcium or magnesium salts may be employed, including for example calcium chloride, calcium hydroxide, calcium formate, calcium malate, calcium maleate, calcium hydroxide and calcium acetate; more generally, calcium sulfate or magnesium salts corresponding to the listed calcium salts may be used. Further increased levels of calcium and/or magnesium may of course be useful, for example for promoting the grease-cutting action of certain types of surfactant.

Detergent Builders or Fillers

A composition may include a minor but effective amount of one or more of a detergent filler which does not perform as a cleaning agent per se, but cooperates with the cleaning agent to enhance the overall cleaning capacity of the composition. Examples of fillers suitable for use in the present cleaning compositions include sodium sulfate, sodium chloride, starch, sugars, $C_1$-$C_{10}$ alkylene glycols such as propylene glycol, and the like. Inorganic or phosphate-containing detergent builders may include alkali metal, ammonium and alkanolammonium salts of polyphosphates (e.g. tripolyphosphates, pyrophosphates, and glassy polymeric meta-phosphates). Non-phosphate builders may also be used. A detergent filler may be included in an amount of 1-20 wt %, or 3-15 wt %.

Defoaming Agents

A minor but effective amount of a defoaming agent for reducing the stability of foam may also be included in the compositions. The cleaning composition can include 0.01-5 wt % of a defoaming agent, or 0.01-3 wt %.

Examples of defoaming agents include silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Divalent Ion

The compositions of the invention may contain a divalent ion, selected from calcium and magnesium ions, at a level of from 0.05% to 5% by weight, or from 0.1% to 1% by weight, or 0.25% by weight of the composition. The divalent ion can be, for example, calcium or magnesium. The calcium ions can, for example, be added as a chloride, hydroxide, oxide, formate, acetate, nitrate salt.

Polyol

The composition of the invention can also include a polyol. The polyol may provide additional stability and hydrotrophic properties to the composition. Propylene glycol and sorbitol are examples of some suitable polyols.

The compositions of the invention may also contain additional typically nonactive materials, with respect to cleaning properties, generally found in liquid pretreatment or detergent compositions in conventional usages. These ingredients are selected to be compatible with the materials of the invention and include such materials as fabric softeners, optical brighteners, soil suspension agents, germicides, viscosity modifiers, inorganic carriers, solidifying agents and the like.

Methods of Making the Compositions

The compositions according to the invention are easily produced by any of a number of known art techniques. Conveniently, a part of the water is supplied to a suitable mixing vessel further provided with a stirrer or agitator, and while stirring, the remaining constituents are added to the mixing vessel, including any final amount of water needed to provide to 100% wt. of the inventive composition.

The compositions may be packaged in any suitable container particularly flasks or bottles, including squeeze-type bottles, as well as bottles provided with a spray apparatus (e.g. trigger spray) which is used to dispense the composition by spraying. Accordingly the compositions are desirably provided as a ready to use product in a manually operated spray dispensing container, or may be supplied in aerosolized product wherein it is discharged from a pressurized aerosol container. Propellants which may be used are well known and conventional in the art and include, for example, a hydrocarbon, of from 1 to 10 carbon atoms, such as n-propane, n-butane, isobutane, n-pentane, isopentane, and mixtures thereof; dimethyl ether and blends thereof as well as individual or mixtures of chloro-, chlorofluoro- and/or fluorohydrocarbons- and/or hydrochlorofluorocarbons (HCFCs). Useful commercially available compositions include A-70 (Aerosol compositions with a vapor pressure of 70 psig available from companies such as Diversified and Aeropress) and Dyme® 152a (1,1-difluoroethane from DuPont). Compressed gases such as carbon dioxide, compressed air, nitrogen, and possibly dense or supercritical fluids may also be used. In such an application, the composition is dispensed by activating the release nozzle of said aerosol type container onto the area in need of treatment, and in accordance with a manner as above-described the area is treated (e.g., cleaned and/or sanitized and/or disinfected). If a propellant is used, it will generally be in an amount of from about 1% to about 50% of the aerosol formulation with preferred amounts being from about 2% to about 25%, more preferably from about 5% to about 15%. Generally speaking, the amount of a particular propellant employed should provide an internal pressure of from about 20 to about 150 psig at 70° F.

Preferably, the composition is adapted for being dispensed using a trigger spray. Alternately, preferably, the composition is adapted for being dispensed using a squeeze bottle through a nozzle.

Whereas the compositions of the present invention are intended to be used in the types of liquid forms described, nothing in this specification shall be understood as to limit the use of the composition according to the invention with a further amount of water to form a cleaning solution there from. In such a proposed diluted cleaning solution, the greater the proportion of water added to form said cleaning dilution will, the greater may be the reduction of the rate and/or efficacy of the thus formed cleaning solution. Accordingly, longer residence times upon the stain to affect their loosening and/or the usage of greater amounts may be necessitated. Preferred dilution ratios of the concentrated hard surface cleaning composition: water of 1:1-100, preferably 1:2-100, more preferably 1:3-100, yet more preferably 1:10-100, and most preferably 1:16-85, on either a weight/weight ("w/w") ratio or alternately on a volume/volume ("v/v") ratio.

Conversely, nothing in the specification shall be also understood to limit the forming of a "super-concentrated" cleaning composition based upon the composition described above. Such a super-concentrated ingredient composition is essentially the same as the cleaning compositions described above except in that they include a lesser amount of water.

Methods of Cleaning

The present invention aims to provide improved water purification/treatment or cleaning compositions and methods for purifying and/or removing cations or suspended solids from water. The invention is primarily directed at removing an oil phase from an aqueous or oil/aqueous mixed phase via foam fractionation. The foam fractionation techniques and additives may be used to remove multiply charged cations and suspended solids in any of a number of water purification embodiments such as clean-up of contaminated water from an oil leak or an oil spill, clean-up of effluent/waste water from Textile Care and food and beverage plants, and restaurants, etc.

According to the invention, a water solution in an aqueous or oil/aqueous mixed phase is treated with an effective amount of a source of alkalinity, an associative thickener and, if necessary, surfactant so that associative thickener and surfactant are in a ratio of greater than 1:1 on an actives weight basis. Other acceptable ratios include 2:1, 3:1, 4:1 or even 5:1.

Once the mixed phase is has the additives, the multiply charged cations and suspended solids may be separated from the solution by foam fractionation. In particular, the mixture is transferred to a suitable foam fractionation column, through which a continuous bubbling of gas is supplied in a counter-current flow. Suitable gases for bubbling include air, nitrogen and carbon dioxide. The gas bubbles carry the associative thickener/surfactant/oil aggregate as a foam into an overhead chamber that is equipped with a mechanical foam breaker to condense the foam.

In general, a foam fractionator comprises a chamber often in a cylindrical shape, and means are provided for supplying air to a lower portion of the chamber for bubbling through water therein. Air is suitably supplied to one or more air blocks in the lower portion of the chamber. An inlet for water is suitably provided at the upper end of the chamber. An outlet from the chamber is suitably provided at a lower end of the chamber. The fifth chamber suitably includes a funnel member at or adjacent the upper level of water in the chamber for collecting waste entrained in bubbles at the surface of the level of water. The funnel member is suitably connected to waste. The funnel member may be adjustably supported for height variations within the chamber of the foam fractionator. Alternatively, the funnel member may be supported by a float or floats at or adjacent the level of water in the foam fractionator chamber.

There are several variations in the method of operating the foam fractionator in accordance with the invention that are likely to increase the efficiency of the oil recovery, 1. The first method involves adding the alkalinity/surfactant/associative thickener system in a single shot at the beginning of the experiment. The experimental results showed that this method is generally not as efficient as other methods. However, the simplicity and ease of dosing the active material is beneficial.
2. The experimental results show that better suspended solids and cation recovery is achieved when the surfactant is added in sequential additions—i.e. surfactant added initially and then added in ten minute intervals.
3. The experimental results also show that better recovery is achieved when the surfactant/associative thickener/alkalinity system is added in sequential additions—i.e. surfactant/associative thickener/alkalinity added initially and then added in ten minute intervals.
4. As stated, better recovery is achieved with sequential additions. It is likely that what is occurring is that the oil able to fully interact with the surfactant, perhaps forming some emulsions before the surfactant has foamed off.

An additional benefit of allowing the surfactant to fully interact with the oil before starting the foam fractionation process is that the water content in the foam can be controlled. This would occur as there would be more oil at the hydrophobic/hydrophilic interface.

Also, this change in level of oil at the interface will also control the foam stability. It is beneficial to have a foam layer that will break fairly readily after it has reached the collection chamber. It is well known that the addition of oil will destabilize foam.

Therefore, the following method will likely increase cation and suspended solids recovery:
   a. Block the air inlet at the beginning of the experiment.
   b. Start the recirculation, add oily soil.
   c. Add surfactant. The recirculation will allow the surfactant to closely interact with the oily soil, perhaps forming some emulsions.

d. Open the air inlet, and allow air injection for foam fractionation.
e. Optionally, surfactant and/or associative thickener after the foam fractionation has proceeded for a period of time.
5. Similarly, the following method including the associative thickener will increase oil recovery.
a. Block the air inlet at the beginning of the experiment.
b. Start the recirculation, add oily soil.
c. Add surfactant. The recirculation will allow the surfactant to closely interact with the oily soil, perhaps forming some emulsions.
d. Add the associative thickener.
e. Open the air inlet, and allow air injection for foam fractionation.

Examples of foam fractionators are described in U.S. Pat. No. 7,0255,883 (particularly columns 11 line 23 through column 33 line 44 and figures associated therewith), and U.S. Pat. No. 7,481,935 (particularly column 4 lines 44 through column 19 lines 25 and figures associated therewith), the disclosures of which are hereby incorporated by reference herein in their entirety. Additionally foam fractionators are widely commercially available from a number of sources including Scientific Associates, LLC. PureShrimp™ Recirculating Aquaculture System. Foam fractionators may also be called protein skimmers.

The present invention will now be further illustrated by way of the following non-limiting examples, in which parts and percentages are by weight unless otherwise indicated.

Example 1

Figure 2:
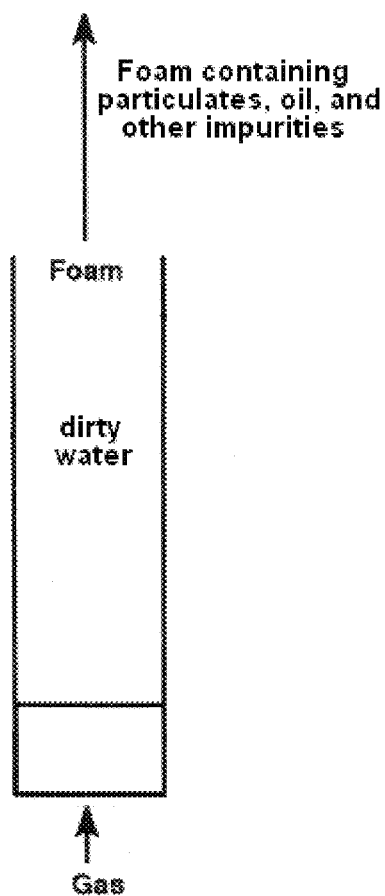
FIG. 2 is a diagram showing the foam fractionation process.
Figure 3:
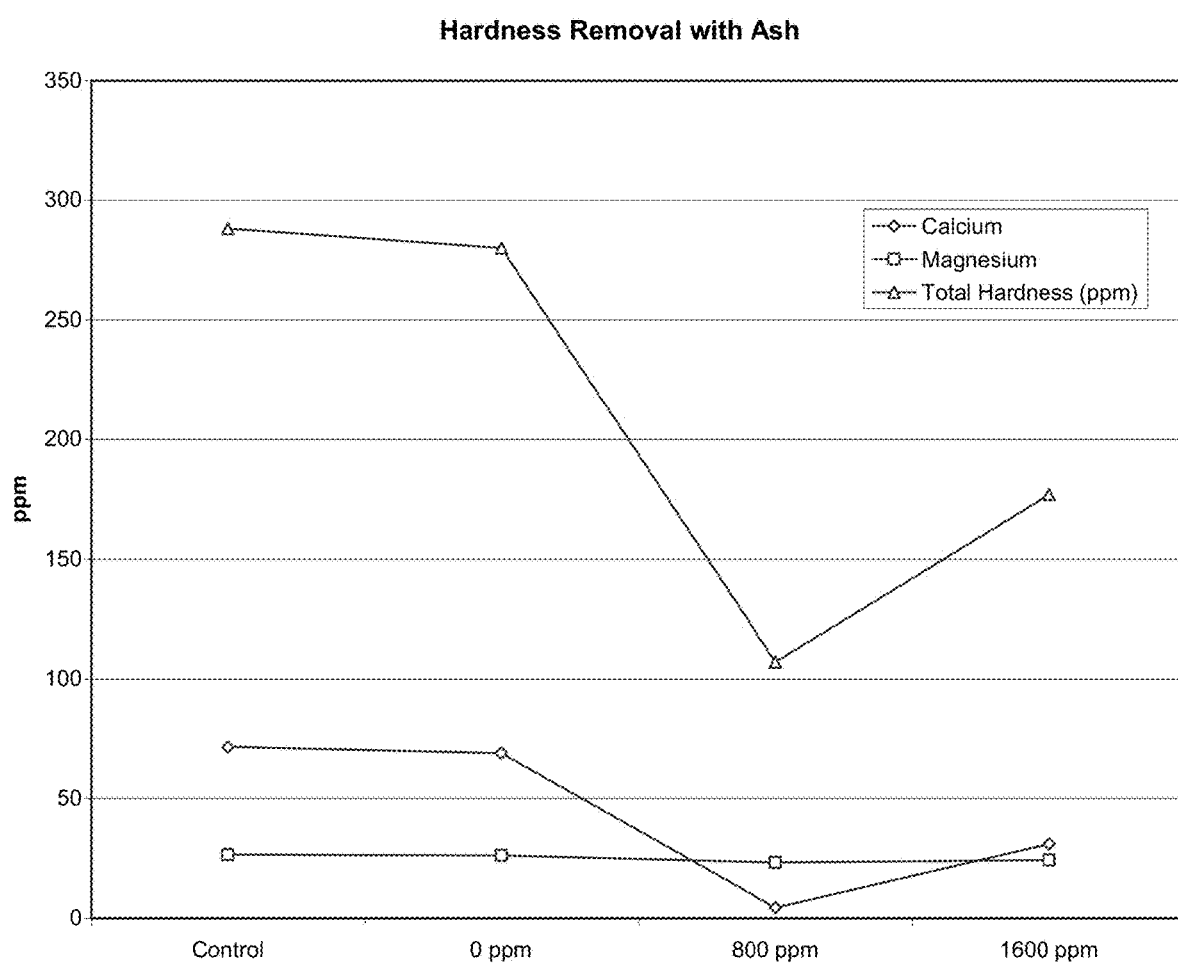
FIG. 3 is a graph showing hardness removal (total hardness, calcium and magnesium) with the composition of the invention and ash with ash levels at 0, 800 and 1600 ppm.
Figure 4:
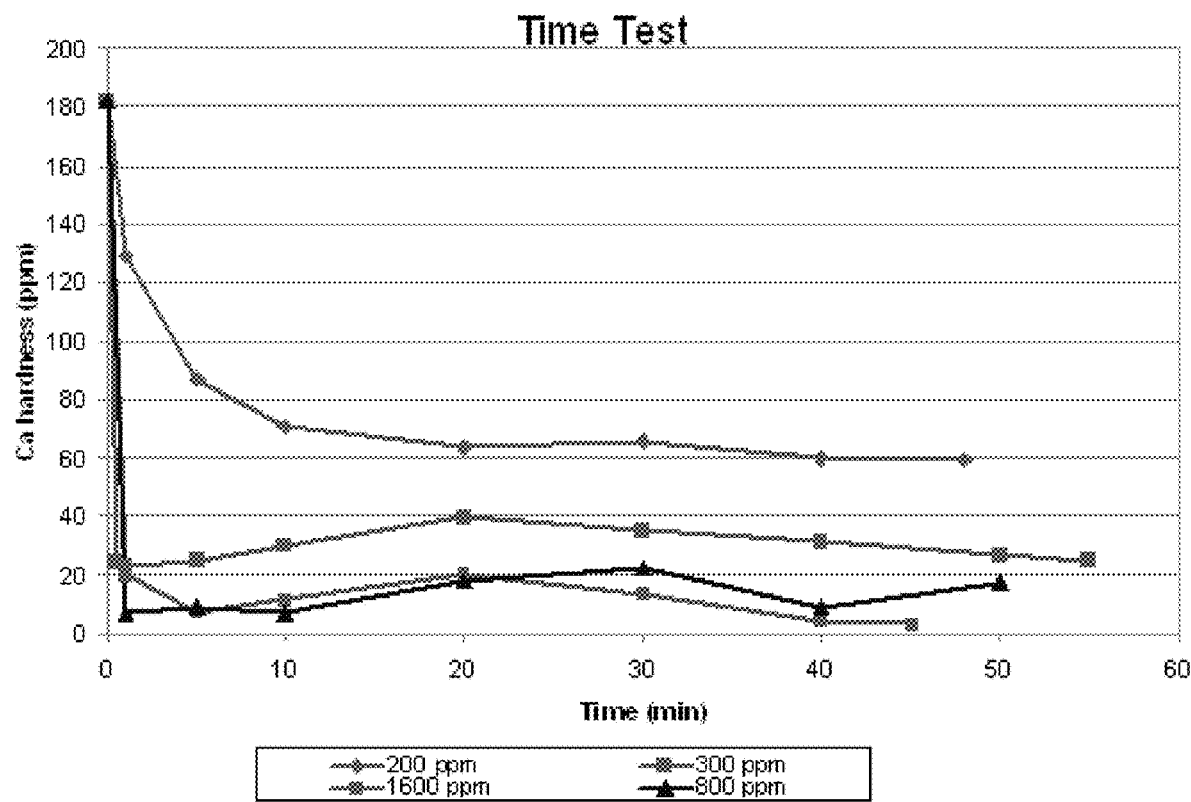
FIG. 4 is a graph of the time test showing removal of calcium at varying levels of caustic over time.

An initial test was conducted to see if hardness can be reduced via foam fractionation. We conducted an experiment utilizing ash to make hardness ions insoluble and then removed by enhanced foam fractionation. (See FIGS. 1 and 2)
Experiment used:
0.04 g T-Maz 80 (11 ppm)(POE (20) SORBITAN. MONOOLEATE)
0.37 g Acusol 820 (30%) (33 ppm) (Hydrophobically modified Alkali Soluble acrylic polymer Emulsion)
Varying levels of ash (0, 800 and 1600 ppm)
Foam fractionation unit used the venturi funnel system with 0.1 psi (See FIG. 1) Ash was mixed in first, without any air induced into the system to mix Then surfactant/polymer was added and air turned on.
The results showed that Hardness can be reduced via foam fractionation with ash and the calcium ions are reduced significantly whereas the magnesium ions are not. See FIG. 3 for a graph of the results.
We conducted another experiment utilizing ash to make hardness ions insoluble to then be removed by enhanced foam fractionation.
Experiment used:
0.04 g T-Maz 80 (11 ppm)
0.37 g Acusol 820 (30%) (33 ppm)
Varying levels of ash (200, 300, 800 and 1600 ppm)
Foam fractionation unit used the venturi funnel system with 0.1 psi
Ash was mixed in first, without any air induced into the system to mix
Then surfactant/polymer was added and air turned on.
Samples collected at varying time intervals.
The results showed that Ash concentration is significant—200 ppm not enough to completely reduce calcium levels With sufficient ash, the calcium ions are removed quickly—within the first minute. See FIG. 4 for a graph of the results. Showing the times test.

Figure 5:
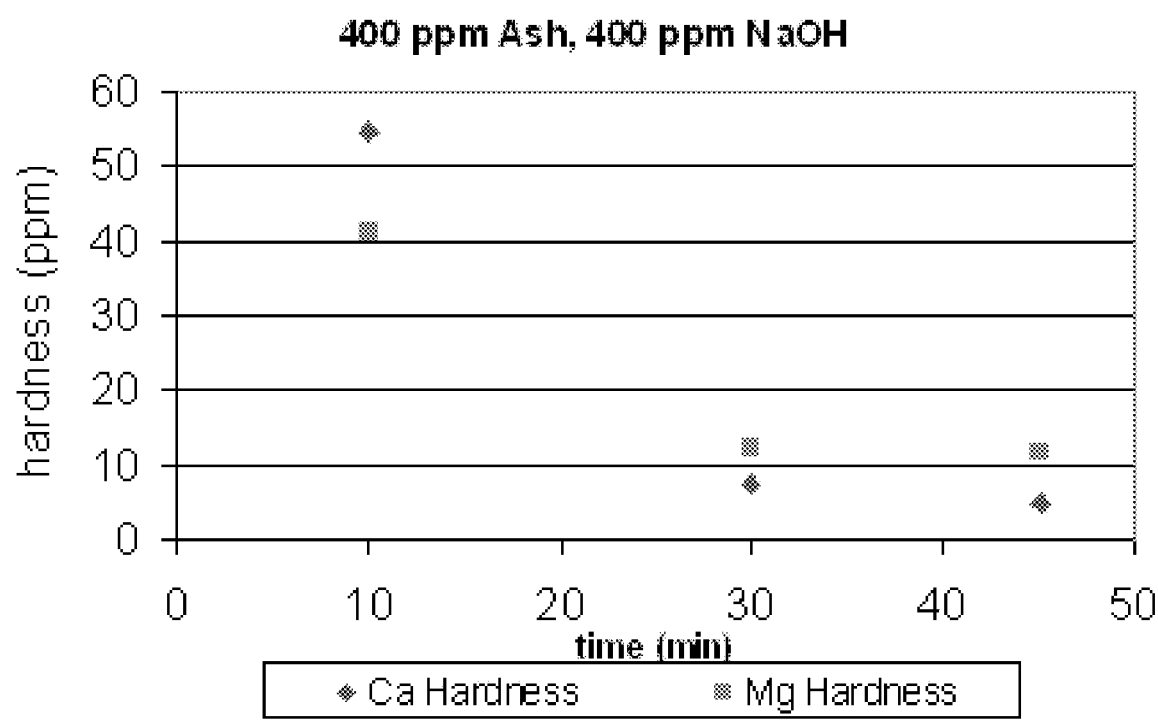
FIG. 5 is a graph of hardness removal over time with ash and caustic (400 ppm each) in addition to the composition of the invention.
Figure 6:
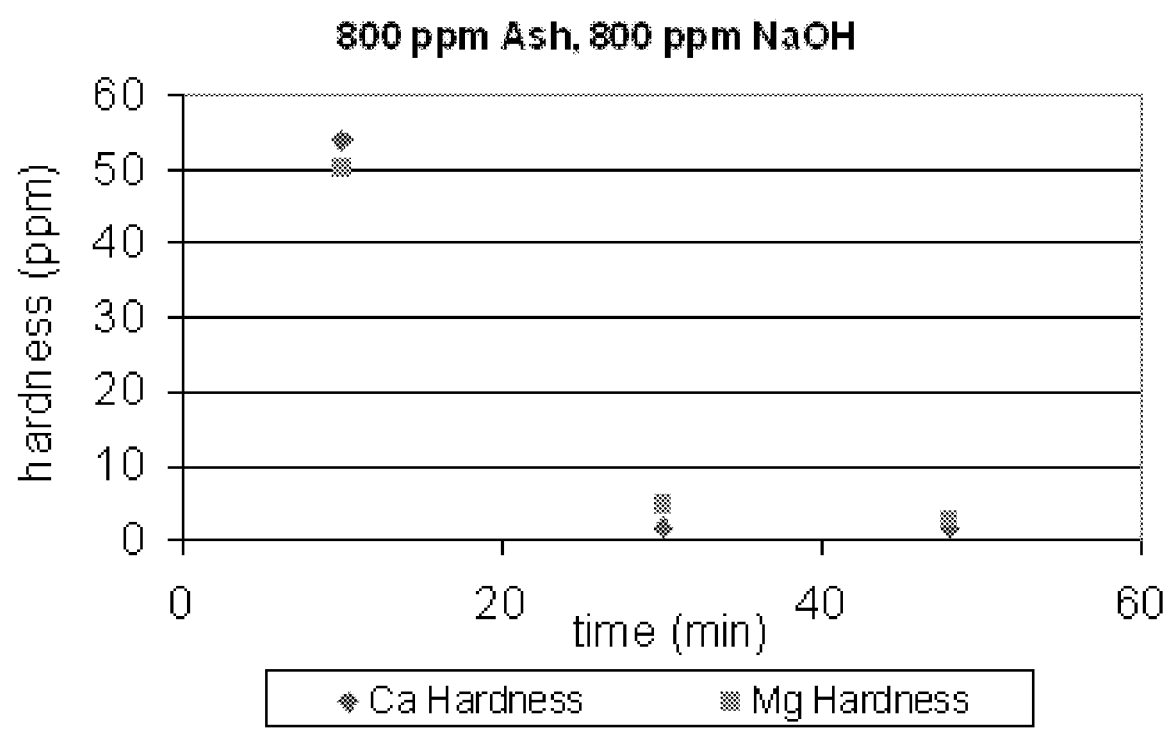
FIG. 6 is a graph of hardness removal over time with ash and caustic (400 ppm each) in addition to the composition of the invention.

NaOH to Remove Magnesium Ions
Experiment utilized ash to make hardness ions insoluble to then be removed by enhanced foam fractionation.
Experiment used:
0.04 g T-Maz 80 (11 ppm)
0.37 g Acusol 820 (30%) (33 ppm)
Varying levels of ash and caustic (50/50 mix) (800 and 1600 ppm total)
Foam fractionation unit used the venturi funnel system with 0.1 psi
Ash/Caustic was mixed in first, without any air induced into the system to mix
Then surfactant/polymer was added and air turned on.
Samples collected at varying time intervals.
The results showed that caustic removes the magnesium ions and the combination of ash and caustic removes both calcium and magnesium ions. See FIG. 5 for the results at 400 ppm ash and 400 ppm caustic and FIG. 6 for results of 800 ppm ash and 800 ppm caustic.

Without being bound by theory, we speculate that the carbonate and caustic turn the cations into insoluble complexes, which become concentrated in the foam phase by our associative thickener/surfactant network through hydrophobic nodules/interactions. The effectiveness in removal is tied to how "insoluble" the complexes are (solubility products), or perhaps there is a cut-off line for effective removal. The following table list the solubility products we have found from literature for the complexes of discussion.

| Complexes | Solubility Products |
| --- | --- |
| $MgCO_3$ | $3.5 \times 10^{-8}$ |
| $CaCO_3$ (calcite) | $4.5 \times 10^{-9}$ |
| $CaCO_3$ (aragonite) | $6.0 \times 10^{-9}$ |
| $Mg(OH)_2$ | $7.1 \times 10^{-12}$ |
| $Ca(OH)_2$ | $6.5 \times 10^{-6}$ |

It is clear that many cations can be removed, including, but are not limited, to $Ca^{2+}$, $Mg^{2+}$, $Cu^{2+}$, $Fe^{2+}$, $Mn^{2+}$, $Pb^{2+}$, etc.

It is also cleared that the invention is about removal of total suspended solids (TSS), whether the TSS occur naturally, or rendered insoluble chemically. It is expected to that other reactants other than ash and caustic can be used, such as oxalate, phosphate, sulfates, etc.

Example 2

A set of experiments were run using the compositions of the invention. First, water samples were collected and held at 40 F post collection. The chemistry used was a 3:1 blend of polymer:surfactant according to the invention:
Polymer—Acusol 820 (45 ppm)
Surfactant—TMAZ 80 (15 ppm)
The composition was added every ten minutes with samples taken immediately before addition of the composition—four total additions. Sample recirculated for one minute with the composition prior to aeration (3.5 psi sparging tube aeration+Venturi).
Table A below show the reduction of total suspended solids and total dissolved solids as well as multiply charged cations at 0 through 4 additions of the composition of the invention.

TABLE A

|  | Control | 1 Addition | 2 Additions | 3 Additions | 4 Additions |
| --- | --- | --- | --- | --- | --- |
| Barium | 0.287 | 0.139 | 0.0727 | 0.0555 | 0.0468 |
| Calcium | 26.6 | 15.9 | 10.9 | 8.32 | 6.54 |
| Copper | 0.604 | 0.354 | 0.171 | <.0981 | <.083 |
| Iron | 11.4 | 4.8 | 2.28 | 1.36 | 1.12 |
| Magnesium | 7.03 | 3.9 | 2.43 | 1.96 | 1.65 |
| Manganese | 0.376 | 0.195 | 0.13 | 0.0854 | 0.0645 |
| Phosphorous | <3.37 | <3.77 | <2.42 | <2.45 | <2.07 |
| Potassium | <33.7 | <37.7 | <24.2 | <24.5 | <20.7 |
| Silicon | 20.2 | 15.8 | 15.7 | 15 | 14.6 |
| Sodium | 280 | 254 | 249 | 243 | 235 |
| Sulfur | 6.59 | 4.58 | 2.81 | 2.67 | 2.93 |
| TDS | 956 | 788 | 740 | 690 | 668 |
| TSS | 372 | 120 | 62 | 54 | 40 |
| Zinc | 1.23 | 0.773 | 0.465 | 0.327 | 0.252 |

Figure 7:
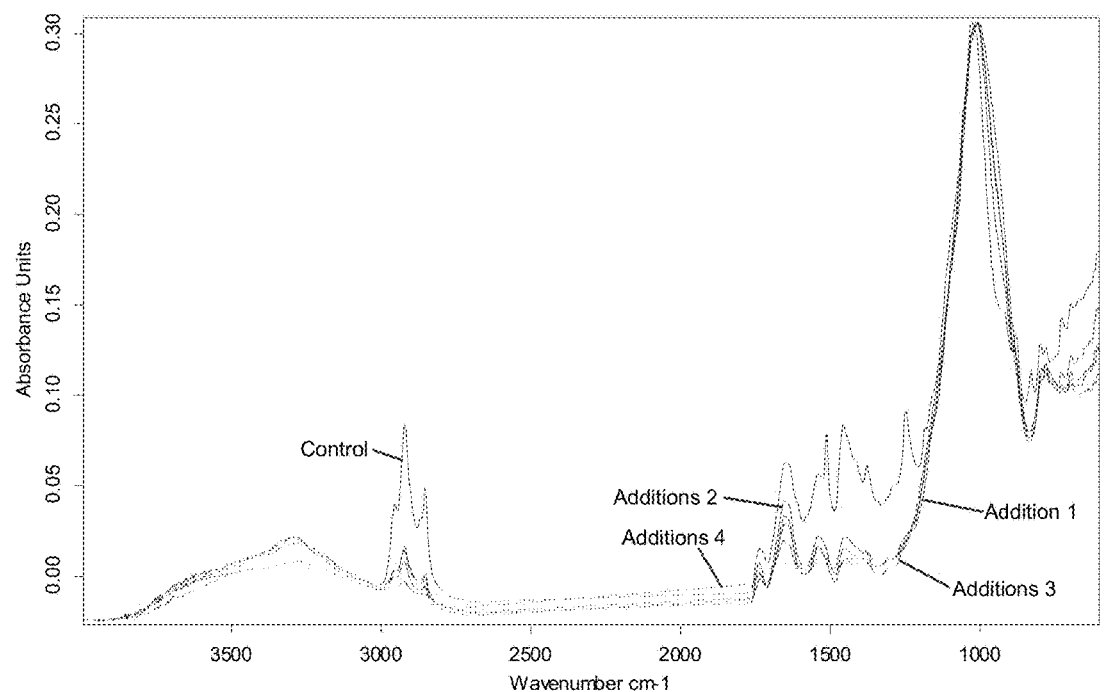
FIG. 7 shows the absorbance of the treated water at 0 through 4 additions. One can see that after 4 additions, the absorbance units are greatly reduced. Blue=control, red=one addition, pink=2 additions, green=3 additions, yellow=4 additions.

FIG. 7 shows the absorbance of the treated water at 0 through 4 additions. One can see that after 4 additions, the absorbance units are greatly reduced. Blue=control, red=one addition, pink=2 additions, green=3 additions, yellow=4 additions.

Additional testing of reclaimed water showed that water initially treated with aquaclear still had 29.7 ppm suspended and dissolved particles. After 1 addition of the composition and foam fractionation there were 10.8 ppm, after 2 additions there were 6.6 ppm and at 3 additions there were 2.1. The composition was 15 ppm T-mz 80 and 45 ppm Acusol 820.

Figure 8:
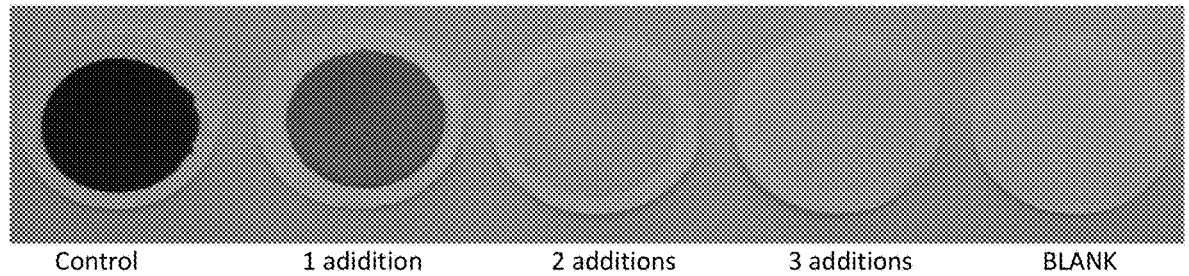
FIG. 8 shows the captured total suspended solids as passed through a filter. One can see that after 3 additions, the filter is indistinguishable from a clean filter. The foam fractionation removed multiply charged cations, hydrocarbons, proteins and carbonate.

FIG. 8 shows the captured total suspended solids as passed through a filter. One can see that after 3 additions, the filter is indistinguishable from a clean filter. The foam fractionation removed multiply charged cations, hydrocarbons, proteins and carbonate.

Figure 9:
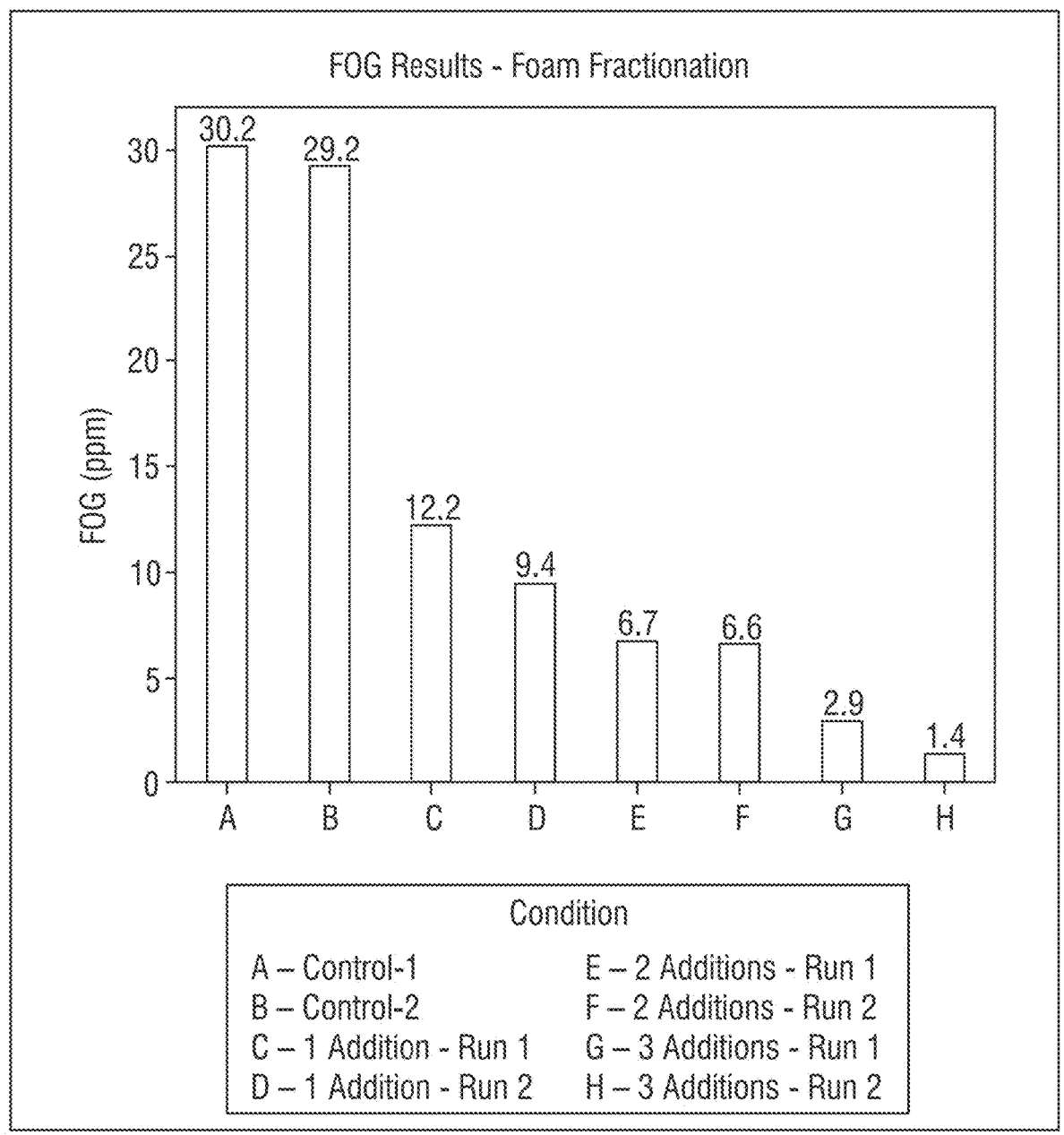
FIG. 9 is a graph showing fat oil and grease (FOG) reduction with the composition of the invention at 0 to 3 additions. One can see that the FOG starts at 30.2 and after 3 additions is down to 2.9 or 1.4.

FIG. 9 is a graph showing fat oil and grease (FOG) reduction with the composition of the invention at 0 to 3 additions. One can see that the FOG starts at 30.2 and after 3 additions is down to 2.9 or 1.4.

Figure 10:
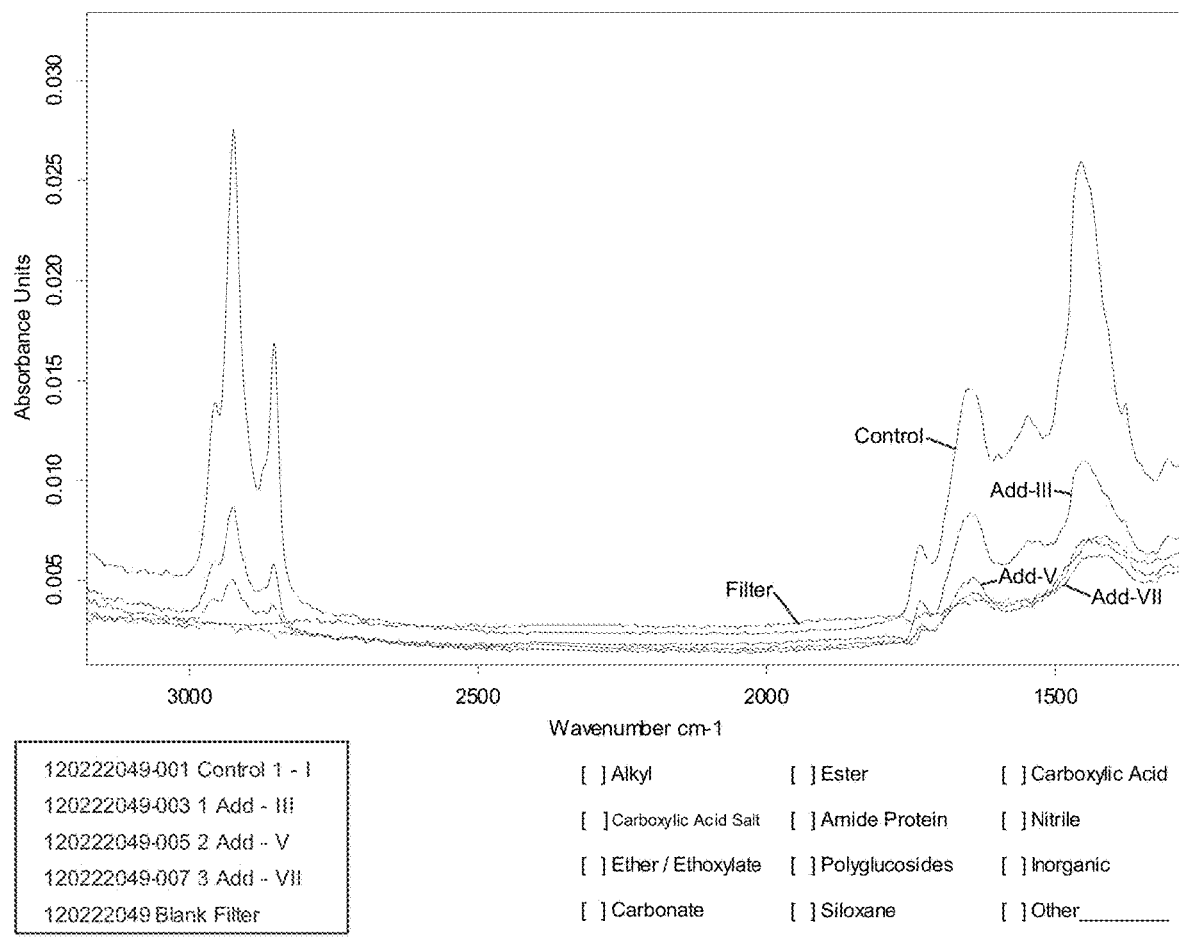
FIG. 10 is a graph of absorbance and wave number of the particulates in the water. After 3 additions, the total suspended solids are reduced to baseline levels, showing near complete removal of hydrocarbon, protein, and carbonate.

FIG. 10 is a graph of absorbance and wave number of the particulates in the water. After 3 additions, the total suspended solids are reduced to baseline levels, showing near complete removal of hydrocarbon, protein, and carbonate.

Table B below shows removal of various elements according to the invention from 0 to 3 additions.

Example 3

Figure 11A:
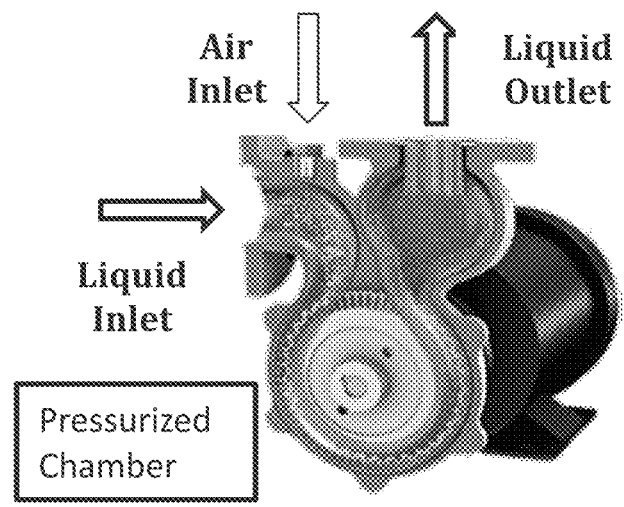
FIGS. 11A and B show different types of foam fractionators that can be used according to the invention.
Figure 11B:
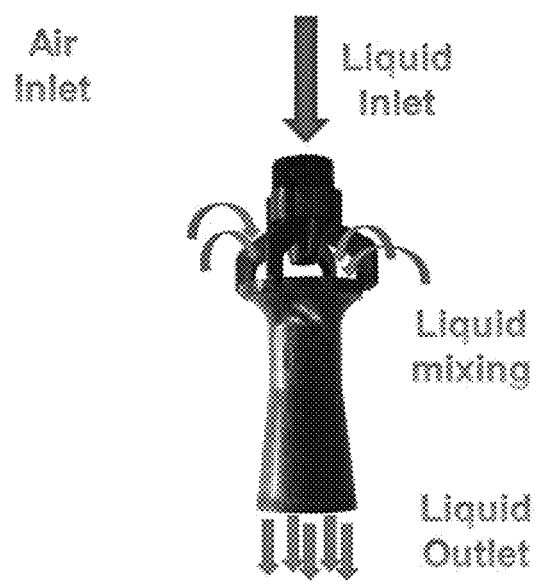

There are a number of foam fractionators available on the market that may be used for the invention. Different sizes include 3 liters, 7 liters, 26 liters and 130 liter columns. Different formats are also available. FIGS. 11A and 11B show different designs of foam factionators which may be used according to the invention. 11A shows a system where air dissolves in high pressure chamber and has built in air introduction. Micobubbles are formed with pressure is released. This system requires separate chemistry introduction and mixing. FIG. 11B shows a system with atmospheric air introduction via suction force. Air bubbles are formed from shearing force in the negative pressure zone of the eductor. This mechanism can use for chemistry, air introduction and mixing.

Figure 12A:
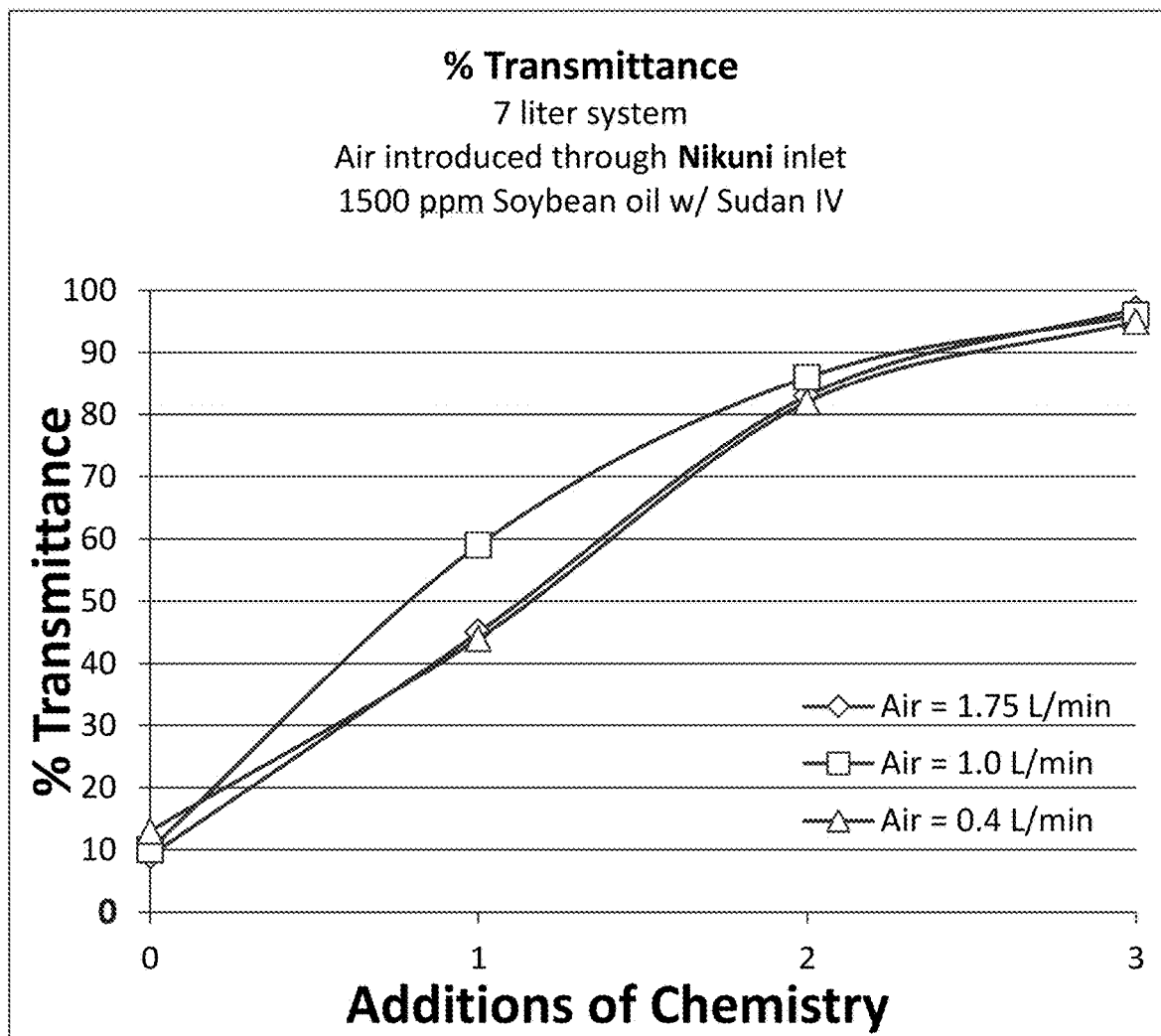
FIGS. 12A and 12B s how that the invention works with various levels of air introduction for each system.
Figure 12B:
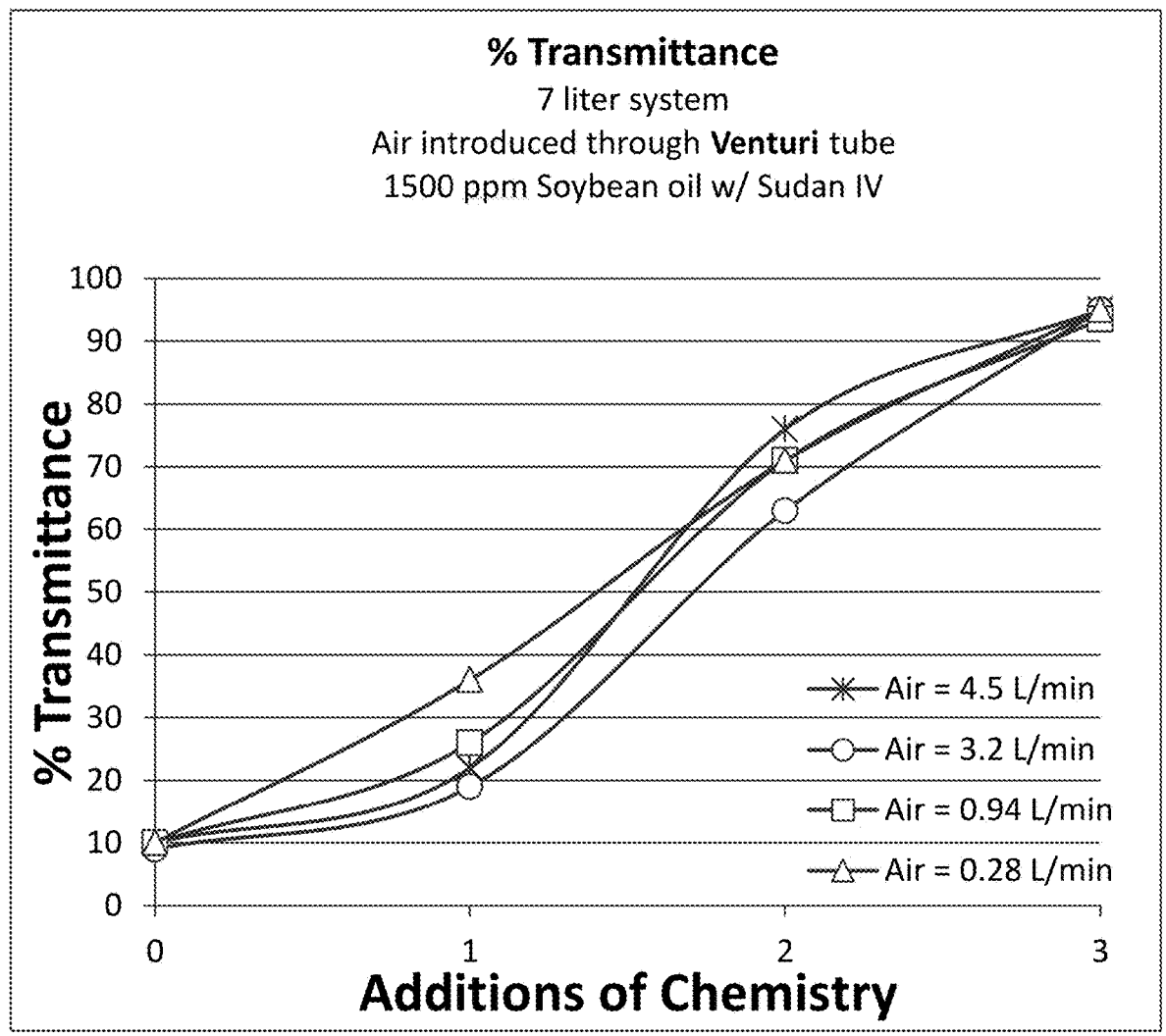

FIGS. 12A and 12B shows two example systems each working with the composition of the invention. Pump settings were—pressure in =−0.04 Mpa/Pressure out=0.175 MPa.

Figure 13:
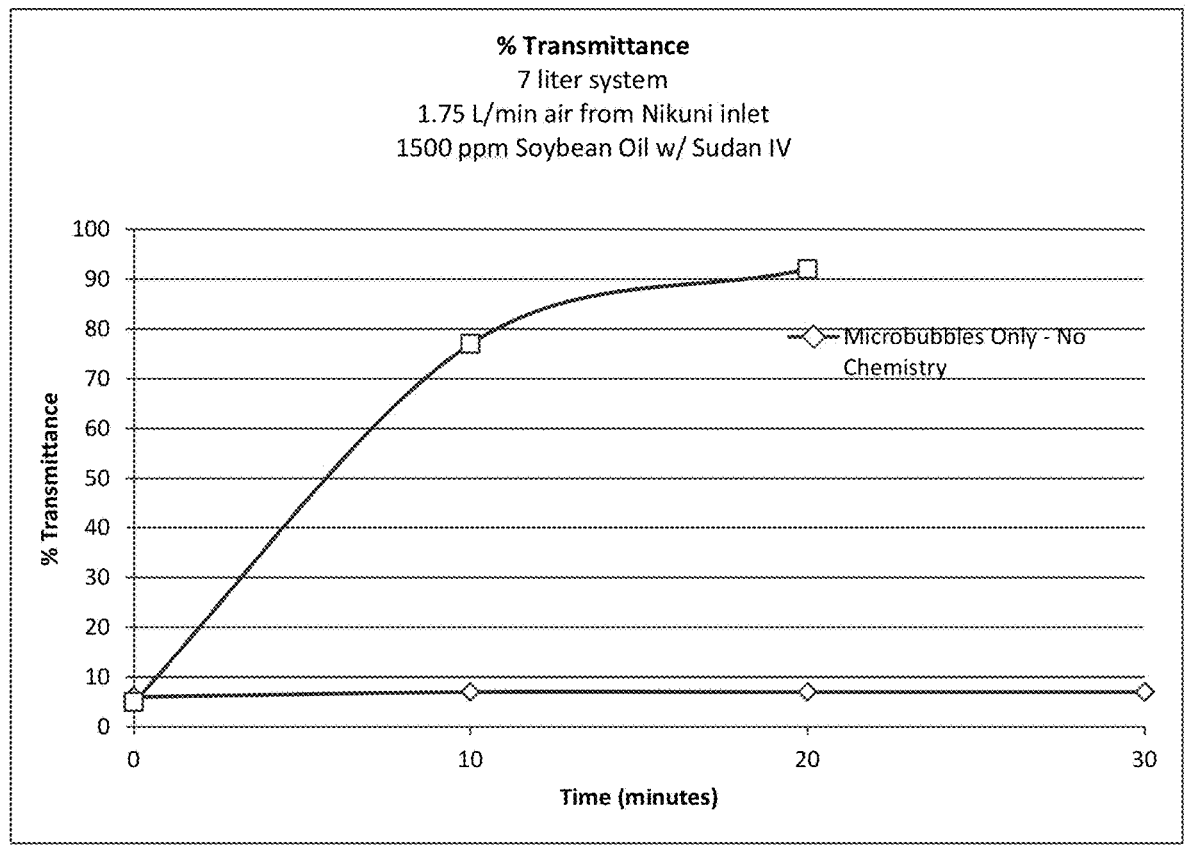
FIG. 13 in a graph showing the transmittance over time with addition of the compositions of the invention.

FIG. 13 shows the importance of the compositions of the invention.

What is claimed is:

1. A composition for improving multiply charged cation and suspended solid removal comprising:
    from 250 to 5000 ppm of a source of alkalinity comprising an alkali metal hydroxide or an alkali metal carbonate, wherein said source of alkalinity acts as an anionic reactant;
    an associative thickener, wherein the viscosity of the associative thickener is more than about 100,000 mPas in a 20% by weight aqueous solution and the viscosity in the Acronal test system at a shear rate of 1 sec-1 is more than about 10,000 mPas; and
    from about 11 to about 60 ppm of a surfactant comprising a sorbitan ester; and wherein the associative thickener and surfactant are present in a weight ratio of from 2:1 to 5:1; wherein said composition is substantially free of cocamide diethanolamine.

2. The composition of claim 1 in addition to source of alkalinity further comprises an anionic reactant, wherein the anionic reactant is one or more of aluminum chloride, aluminum sulfate, barium chloride, calcium acetate, calcium chloride, calcium formate, magnesium acetate, magnesium

TABLE B

|  | Control | Control | 1 Addition | 1 Addition | 2 Additions | 2 Additions | 3 Additions | 3 Additions |
| --- | --- | --- | --- | --- | --- | --- | --- | --- |
| Barium (ppm) | 0.456 | 0.481 | 0.382 | 0.395 | 0.311 | 0.339 | 0.214 | 0.254 |
| Calcium (ppm) | 130 | 135 | 105 | 105 | 101 | 106 | 94 | 94.5 |
| Calcium Hardness (ppm as CaCO3) | 325 | 337 | 262 | 252 | 252 | 265 | 235 | 236 |
| Copper (ppm) | 0.289 | 0.375 | 0.186 | 0.177 | 0.094 | 0.11 | 0.105 | 0.0815 |
| Iron (ppm) | 4.2 | 4.5 | 2.91 | 2.92 | 2.42 | 2.59 | 2.06 | 2 |
| Magnesium (ppm) | 39.8 | 41.5 | 32 | 32 | 30.9 | 32.5 | 29 | 29.2 |
| Magnesium Hardness (ppm as CaCO3) | 164 | 171 | 132 | 132 | 127 | 134 | 119 | 120 |
| Manganese | 0.324 | 0.345 | 0.258 | 0.26 | 0.245 | 0.25 | 0.229 | 0.228 |
| Phosphorous | 5.77 | 6.82 | 3.5 | 4.18 | 2.55 | 3.51 | 2.68 | 2.5 |
| Potassium | 25.7 | 27.2 | 22.7 | 23.1 | 21 | 21.7 | 19.9 | 20.4 |
| Silicon | 8.74 | 9.03 | 9.22 | 9.09 | 8.46 | 8.85 | 8.2 | 7.75 |
| Sodium | 915 | 962 | 778 | 781 | 750 | 789 | 728 | 740 |
| Sulfur | 264 | 292 | 224 | 213 | 180 | 208 | 260 | 293 |
| Total Hardness | 489 | 508 | 394 | 394 | 379 | 399 | 354 | 356 |
| Total Hardness GPG | 28.6 | 29.7 | 23 | 23 | 22.2 | 23.3 | 20.7 | 20.8 |
| Zinc | 0.779 | 0.82 | 0.443 | 0.471 | 0.218 | 0.255 | 0.142 | 0.0815 | chloride, magnesium formate, zinc acetate, zinc chloride, zinc formate, zinc sulfate, sodium fluoride, sodium citrate, and sodium oxalate.

3. The composition of claim 1 wherein said associative thickener is a hydrophobically modified polymer.

4. The composition of claim 3 wherein said associative thickener is an acyclic polymer.

5. The composition of claim 1 wherein said composition further comprises a viscoelastic surfactant.

6. The composition of claim 5 wherein said viscoelastic surfactant is a betaine, amine oxide, or ethoxylated fatty amine.

7. The composition of claim 1 wherein said surfactant is POE(20) sorbitan monooleate.

8. A method of improving multiply charged cations and suspended solids removal by foam fractionation from an aqueous or oil/aqueous phase solution comprising:
adding to said solution an effective amount of associative thickener wherein the viscosity of the associative thickener is more than about 100,000 mPas in a 20% by weight aqueous solution and the viscosity in the Acronal test system at a shear rate of 1 sec-1 is more than about 10,000 mPas in the presence of from about 11 to about 60 ppm of a surfactant and from 250 to 5000 ppm of a source of alkalinity; wherein said surfactant comprises a sorbitan ester, wherein said source of alkalinity acts as an anionic reactant and comprises an alkali metal hydroxide or an alkali metal carbonate; and wherein said solution is substantially free of cocamide diethanolamine and further wherein the associative thickener and surfactant are present in a weight ratio of from 2:1 to 5:1.

9. The method of claim 8 wherein said surfactant is present in said solution prior to the addition of said associative thickener.

10. The method of claim 8 wherein said surfactant is present in a mixture with said associative thickener.

11. The method of claim 8 wherein said associative thickener is a hydrophobically modified polymer.

12. The method of claim 8 wherein said associative thickener is an acyclic polymer.

13. The method of claim 8 further comprising the steps of:
adding an effective amount of surfactant to said aqueous or oil/aqueous emulsion;
allowing the surfactant to interact with the oil or suspended solids therein, to form an emulsion, thereafter;
adding an effective amount of associative thickener to form a mixture;
injecting air to said mixture for foam fractionation; and wherein said mixture is substantially free of cocamide diethanolamine.

14. The method of claim 8 wherein said surfactant and associative thickener are added so that the ratio of associative thickener to surfactant greater than 1:1 by weight.

15. A method of removing multiply charged cations and suspended solids from an aqueous phase comprising:
providing an aqueous solution having cations and suspended solids therein to a foam fractionator;
adding to said solution from 250 to 5000 ppm of a source of alkalinity comprising an alkali metal hydroxide or an alkali metal carbonate, wherein said source of alkalinity acts as an anionic reactant;
adding an from about 11 to about 60 ppm of an ethoxylated sorbitan ester surfactant; allowing said surfactant to form an emulsion with said aqueous solution;
adding an effective amount of an associative thickener wherein the viscosity of the associative thickener is more than about 100,000 mPas in a 20% by weight aqueous solution and the viscosity in the Acronal test system at a shear rate of 1 sec-1 is more than about 10,000 mPas and comprising an acrylic polymer to said aqueous emulsion wherein the associative thickener and surfactant are present in a weight ratio of from 2:1 to 5:1; and
injecting air to said emulsion for foam fractionation and removal of said multiply charged cations and suspended solids; wherein said aqueous emulsion is substantially free of cocamide diethanolamine.

16. The method of claim 15 wherein said foam fractionation is to recycle water used in a cleaning process.

17. The method of claim 15 wherein said foam fractionation is to clean water for recycling in a cleaning system that removes multiply charged cations and suspended solids.

18. The composition of claim 1 wherein the source of alkalinity comprises an alkali metal hydroxide and an alkali metal carbonate.

\* \* \* \* \*